US009491684B2

(12) United States Patent
Cordeiro De Oliveira Barros et al.

(10) Patent No.: US 9,491,684 B2
(45) Date of Patent: Nov. 8, 2016

(54) DENSITY-AWARE ZONE-BASED PACKET FORWARDING IN VEHICULAR NETWORKS

(71) Applicants: UNIVERSIDADE DO PORTO, Porto (PT); CARNEGIE MELLON UNIVERSITY, Pittsburg, PA (US)

(72) Inventors: João Francisco Cordeiro De Oliveira Barros, Porto (PT); Rui Manuel Pacheco Meireles, Porto (PT); Peter Alfons Roland Steenkiste, Pittsburgh, PA (US)

(73) Assignees: Universidade Do Porto, Porto (PT); Carnegie Mellon University, Pittsburg, PA (US)

( * ) Notice: Subject to any disclaimer, the term of this patent is extended or adjusted under 35 U.S.C. 154(b) by 0 days.

(21) Appl. No.: 14/404,737

(22) PCT Filed: Sep. 30, 2013

(86) PCT No.: PCT/IB2013/059012
§ 371 (c)(1),
(2) Date: Dec. 1, 2014

(87) PCT Pub. No.: WO2014/072849
PCT Pub. Date: May 15, 2014

(65) Prior Publication Data
US 2015/0163720 A1     Jun. 11, 2015

(30) Foreign Application Priority Data

Nov. 6, 2012 (PT) .......................... 106623

(51) Int. Cl.
*H04W 40/20* (2009.01)
*G08G 1/09* (2006.01)
(Continued)

(52) U.S. Cl.
CPC ............. *H04W 40/20* (2013.01); *G08G 1/093* (2013.01); *G08G 1/163* (2013.01); *H04L 45/126* (2013.01); *H04L 47/32* (2013.01); *H04L 67/12* (2013.01); *H04W 40/246* (2013.01); *H04W 72/0446* (2013.01); *H04W 72/06* (2013.01); *H04W 40/244* (2013.01)

(58) Field of Classification Search
CPC ........... H04W 48/20; H04W 52/0206; H04W 72/0406; H04W 40/20; H04W 40/026; H04W 40/246; H04W 84/18; H04W 36/08; H04W 8/14; H04W 4/18; H04W 4/021; H04W 4/025; H04W 24/02; H04L 45/126; H04L 45/02; H04L 45/20; H04L 47/17; H04L 25/03923
See application file for complete search history.

(56) References Cited

U.S. PATENT DOCUMENTS

2010/0262709 A1   10/2010  Hiie et al.
2011/0069686 A1*  3/2011  Raman .................. H04L 12/413
                                                    370/338
(Continued)

FOREIGN PATENT DOCUMENTS

WO     WO2010025094     3/2010

OTHER PUBLICATIONS

F. Bai; H. Krishnan; V. Sadekar; G. Holl; T. Elbatt: 'Towards characterizing and classifyingcommunication-based automotive applications from a wireless networking perspective' Proceedings of IEEE Workshop on Automotive Networking and Applications 2006.

(Continued)

*Primary Examiner* — Anh Ngoc Nguyen
*Assistant Examiner* — Ricardo Castaneyra
(74) *Attorney, Agent, or Firm* — Occhiuti & Rohlicek LLP

(57) ABSTRACT

A method for multi-hop forwarding of data packets in vehicular ad-hoc networks is disclosed. Each node knows both its own and the destination's geographical coordinates. The coordinates of the one-hop neighbors are obtained from periodically broadcast Cooperative-Awareness Messages (CAMs). The method comprises the following distributed coordination scheme, executed by each node upon receiving a packet: i) computing the set of candidate forwarders; ii) ranking the candidate forwarders according to an utility metric; iii) forwarding the packet after a period of time proportional to its rank if top-ranked, dropping the packet otherwise. The base utility metric used for ranking forwarders is the inverse of the distance to the destination. Moreover, an extension is disclosed where this metric is replaced by the inverse of the expected number of packet transmissions to reach the destination. The latter metric is calculated based on spatial connectivity information cooperatively collected by nodes in the network.

33 Claims, 10 Drawing Sheets

(51) Int. Cl.
*G08G 1/16* (2006.01)
*H04L 12/823* (2013.01)
*H04L 29/08* (2006.01)
*H04W 72/04* (2009.01)
*H04W 72/06* (2009.01)
*H04L 12/733* (2013.01)
*H04W 40/24* (2009.01)

(56) References Cited

U.S. PATENT DOCUMENTS

| | | |
|---|---|---|
| 2012/0238275 A1 | 9/2012 | Galwas et al. |
| 2012/0243434 A1 | 9/2012 | Butler |
| 2013/0058352 A1* | 3/2013 | Goergen ............... H04W 40/20 370/400 |

OTHER PUBLICATIONS

R. Meireles; M. Boban; P. Steenkiste; O. Tonguz; J. Barros: 'Vehicular Networking Conference', 2010, IEEE deel 'Experimental study on the impact of vehicular obstructions in vanets'.
F. Bai; D. D. Stancil; H. Krishnan: 'Proceedings of the 16th annual international conference on Mobile computing and networking, ser. MobiCom'10', 2010, ACM deel 'Toward understanding characteristics of dedicated short range communications (dsrc) from a perspective of vehicular network engineers'.
B.-C. Seet; G. Liu; B.-S. Lee; C.-H. Foh; K.-J. Wong; K.-K. Lee: 'Networking', vol. 3042, 2004, Springer deel 'A-star: A mobile ad hoc routing strategy for metropolis vehicular communications'.
M. Jerbi; S.-M. Senouci; R. Meraihi; Y. Ghamri-Doudane: 'An improved vehicular ad hoc routing protocol for city environments' Communications, ICC 07'. IEEE International Conference on 2007.
S. Biswas; R. Morris: 'ExOR: opportunistic multi-hop routing for wireless networks' Computer Communication Review vol. 35, No. 4, 2005.
M.-H. Lu; P. Steenkiste; T. Chen: 'Proceedings of the 15th annual international conference on Mobile computing and networking, ser. MobiCom '09', 2009, ACM deel 'Design, implementation and evaluation of an efficient opportunistic retransmission protocol'.
A. Miu; H. Balakrishnan; C. E. Koksal: 'Proceedings of the IIth annual international conference on Mobile computing and networking, ser. MobiCom '05', 2005, ACM deel 'Improving loss resilience with multi-radio diversity in wireless networks'.
D. B. Johnson; D. A. Maltz: 'Dynamic source routing in ad hoc wireless networks', 1996, Mobile Computing. Kluwer Academic Publishers.
B. Karp; H. T. Kung: 'Gpsr: Greedy perimeter stateless routing for wireless networks' Mobile Computing and Networking 2000.
F. Bai; Bai; B. Krishnamachari Spatio-Temporal Variations of Vehicle Traffic in Vanets: Facts and Implications 2009.
Q. Yang; A. Lim; S. Li; J. Fang; P. Agrawal: 'Acar: Adaptive connectivity aware routing for vehicular ad hoc networks in city scenarios' Mobile Networks and Applications vol. 15, 2010.
A. Festag; R. Baldessari; W. Zhang; L. Le; A. Sarma; M. Fukukawa: 'Car-2-x communication for safety and infotainment in europe' NEC Technical Journal vol. 3, No. 1, 2008.
Manifesto—Overview of the C2C-CC System 2007.
J. Li; J. Jannotti; D. De Couto; D. Karger; R. Morris: 'Proceedings of the 6th annual international conference on Mobile computing and networking, ser. MobiCom'00', 2000, ACM deel 'A scalable location service for geographic ad hoc routing'.
J. S. Otto; F. E. Bustamante; R. A. Berry: 'Down the block and around the corner—the impact of radio propagation on inter-vehicle wireless communication' Proc. of IEEE International Conference on Distributed Computing Systems (ICDCS 2009.
S. Kaul; K. Ramachandran; P. Shankar; S. Oh; M. Gruteser; Seskar; T. Nadeem: 'Effect of antenna placement and diversity on vehicular network communications' Sensor, Mesh and Ad Hoc Communications and Networks, 2007. SECON '07. 4th Annual IEEE Communications Society Conference on 2007.
D. Couto; D. Aguayo; J. Bicket; R. Morris: 'A high-throughput path metric for multi-hop wireless routing' Wireless Networks vol. 11, No. 4, 2005.
M. Heissenbuttel; T. Braun; T. Bernoulli; M. Walchli: 'Blr: Beaconless routing algorithm for mobile ad-hoc networks' Elseviers Computer Communications Journal vol. 27, 2003.
H. FUF3LER; J. Widmer; M. Kasemann; M. Mauve; H. Hartenstein: 'Contention-based forwarding for mobile ad hoc networks' Ad Hoc Networks vol. 1, No. 4, 2003.
R. S. Schwartz; K. Das; H. Scholten; P. Havinga: 'Proceedings of the 9th ACM international workshop on Vehicular inter-networking, systems, and applications. ser. VANET '12', 2012, ACM deel'Exploiting beacons for scalable broadcast data dissemination in vanets'.
Chachulski; M. Jennings; S. Katti; D. Katabi: 'Proceedings of the 2007 conference on Applications, technologies, architectures, and protocols for computer communications.', 2007, ACM deel 'Trading structure for randomness in wireless opportunistic routing'.
S.-Y. Ni; Y.-C. Tseng; Y.-S. Chen; J.-P. Sheu: 'Proceedings of the 5th annual ACM/IEEE international conference on Mobile computing and networking, ser. MobiCom'99', 1999, ACM deel 'The broadcast storm problem in a mobile ad hoc network'.
Y. Mylonas; M. Lestas; A. Pitsillides: 'Speed adaptive probabilistic flooding in cooperative emergency warning' Proceedings of the 4th Annual International Conference on Wireless Internet, Ser. WICON '08. ICST 2008.
N. Wisitpongphan; O. Tonguz; J. Parikh; P. Mudalige; F. Bai; V. Sadekar: 'Broadcast storm mitigation techniques in vehicular ad hoc networks' Wireless Communications, IEEE vol. 14, No. 6, 2007.
L. Briesemeister: 'Group membership and communication in highly mobile ad hoc networks' Ph.D. Dissertation 2001.
W. Li; J.-B. Wei; S. Wang: 'Wireless Communications and Networking Conference, 2007.WCNC 2007', 2007, IEEE deel 'An evolutionary-dynamic tdma slot assignment protocol for ad hoc networks'.
S. Kamruzzaman; M. Alam: 'Dynamic tdma slot reservation protocol for cognitive radio ad hoc networks' Computer and Information Technology (ICCIT), 2010 13th International Conference on 2010.
Vegni, A. M. et al., "*SRB: A Selective Reliable Broadcast protocol for safety applications in VANETs*", 2012 International Conference on Selected Topics in Mobile & Wireless Networking (iCOST), Jul. 2-4, 2012, Avignon, France, IEEE, Piscataway, NJ, USA, pp. 89-94 Jul. 2, 2012.
Ming, L. et al., "*OppCast: opportunistic broadcast of warning messages in VANETs with unreliable links*", 2009 IEEE 6th International Conference on Mobile Ad hoc and Sensor Systems (MASS) 2009, Oct. 12-15, 2009, Macau, China, IEEE, Piscataway, NJ, USA, pp. 534-543 Oct. 12, 2009.
Ming, L. et al., "*Opportunistic broadcast of eventdriven warning messages in Vehicular Ad Hoc Networks with lossy links*", Computer Networks, vol. 55, No. 10, Jul. 14, 2011 (online Apr. 23, 2011), Elsevier Science B.V., Netherlands, pp. 2443-2464 Apr. 23, 2011.
Wu, C. et al., "*OFA: Opportunistic forwarding and acknowledgement for vehicular ad hoc networks*", Proceedings of the 6th International Conference on Broadband Communications & Biomedical Applications (IB2COM), Nov. 21-24, 2011, Melbourne, Australia, IEEE, pp. 213-218 Nov. 21, 2011.
Wu, C. et al., "*Fuzzy Logic Based Multi-Hop Broadcast for High-Density Vehicular Ad Hoc Networks*", Proceedings 2010 IEEE VehicularNetworking Conference (VNC 2010), Dec. 13-15, 2010, Jersey City, NJ, USA, IEEE Computer Society, Los Alamitos, CA, USA, pp. 17-24 Dec. 13, 2010.
Fei, Y. et al. "*Prioritized Broadcast Contention Control in VANET*", ICC 2010—2010 IEEE International Conference on Communications, May 23-27, 2010,Cape Town, South Africa, IEEE, Piscataway, NJ, USA, 5 pp. 2010.05.23A30.

* cited by examiner

DENSITY-AWARE ZONE-BASED PACKET FORWARDING IN VEHICULAR NETWORKS

CROSS REFERENCE TO RELATED APPLICATION

This application is the national phase under 35 USC 371 of international application no. PCT/IB2013/059012, filed Sep. 30, 2013, which claims the benefit of the priority date of Portuguese application no. 106623, filed Nov. 6, 2012. The contents of the aforementioned applications are incorporated herein in their entirety.

TECHNICAL FIELD

The present invention relates to the transmission of digital information by data switching networks, in particular routing or path finding of packets in data switching networks, store-and-forward switching systems or packet switching systems.

SUMMARY

A zone-based forwarding scheme is presented, herein referred as DAZL, that lets any node in a geographic region forward a packet towards a destination. The protocol is entirely distributed and relies only on local information. In contrast to traditional neighbor-based protocols, zone-based forwarding has built-in redundancy that makes it robust with respect to the unpredictable packet delivery rates found in vehicular networks. To reduce contention in high-density scenarios, the disclosure uses a slot-based algorithm that adapts the forwarding zone's size according to the local node density. Moreover, forwarders are prioritized to maximize hop length. This approach offers a good balance between high throughput and low latency and replication.

The disclosure was evaluated using both experiments and simulations. It was found that it outperforms neighbor-based schemes for all node densities, with improvements of around 60% in throughput. Furthermore, throughput is up to 90% of what could be achieved with an oracle protocol that knows what packets are received and lost, something that cannot be implemented in practice.

The disclosure comprises a method for distributed multi-hop packet forwarding based on geographic coordinates for vehicular communications between nodes, each node having its own geographical coordinates and the geographical coordinates of the destination node of one said vehicular communication being known, said method comprising each node obtaining its one-hop neighbor nodes' coordinates from periodically broadcast beacons from said neighbor nodes and said method comprising the steps for each node, at each hop, upon receiving a packet:

based on the current node's position and the packet header information, verifying if the current node is closer to the destination than the previous hop; if not, dropping the packet;

ranking the utility of the current node as a forwarder against the utility of the potential forwarder nodes which are the said one-hop neighbor nodes that are closer to the destination than the previous hop;

if the current node is one of a predetermined number of best utility ranked forwarder nodes, then considering the current node as being in the forwarding zone; if not, dropping the packet;

if the current node is in the forwarding zone, waiting a period of time inversely proportional to the current node utility rank before forwarding the packet;

if, while waiting, the current node overhears another node forwarding the same packet, cancelling the forwarding of the packet;

wherein the packet header comprises three node addresses: original packet source, packet destination, and packet previous hop, wherein each address includes both the respective node identifier and geographic coordinates, and wherein said nodes are vehicle nodes or a mix of vehicle nodes and fixed nodes.

An embodiment comprises each node acknowledging, to the previous hop node, the transmission of a packet by its own forwarding of the packet.

An embodiment comprises each node retransmitting a packet if no acknowledgment of said packet has been received after a predetermined time limit.

An embodiment comprises each node keeping a history of overheard packets and dropping packets if they are present in said history.

An embodiment comprises introducing transmission slotting at the network layer, by dividing the time after a packet reception into a number of forwarding slots, wherein the potential forwarder nodes distribute themselves for transmission over the slots without explicit coordination, each node being assigned one and only one slot, and each slot having zero or more nodes, wherein the slot duration is sufficiently long that nodes in different forwarding slots will not contend at the MAC level if their contention windows overlap, and the slot duration is sufficiently short that latency is mitigated, in particular the slot duration is longer but not substantially longer than the average MAC layer contention window.

An embodiment comprises, for ranking the utility of the current node as a potential forwarder, considering if the node is in the forwarding zone and waiting a period of time inversely proportional to the current node utility rank, the following steps for each potential forwarder node, at each hop and for each packet:

defining the node set of potential forwarders for the current packet, said set being composed of the nodes that are both closer to the destination node than the previous hop and within the current node radio range;

building an array from said set and sorting the array from the node closest to the destination node to the node farthest from the destination node;

considering the index at which a node appears in said array being its utility rank as a forwarder;

for each node in said set, assigning it a forwarding slot calculated by the value of the smallest integer not less than the division of said node utility rank divided by a predetermined number of nodes per slot;

wherein each node refrains from forwarding if the node is not one of a predetermined number of best utility ranked forwarder nodes.

In an embodiment, the predetermined number of best utility ranked forwarder nodes is not more than 5, not more than 10, or not more than 15.

In an embodiment, the destination node is addressable by its geographical coordinates through prior knowledge of its geographical coordinates or a through a location service.

In an embodiment, ranking the utility of the node as a forwarder comprises ranking by the distance to the destination, in particular by the hop length distance.

In an embodiment, ranking the utility of the node as a forwarder comprises ranking the utility of the node as a forwarder based on spatial connectivity information which is collected, aggregated, and distributed, comprising the steps of:

each node, over a period or periods of time, recording information about its position and the CAMs, Cooperative Awareness Messages, it receives from other nodes;

each node uploading CAM data records to a spatial connectivity server, said CAM data records comprising the geographical coordinates of each of the nodes which emitted said collected CAMs, and optionally the RSSI of said CAMs;

the spatial connectivity server aggregating and processing said CAM data records into a spatial connectivity graph comprising nodes and edges, where the nodes are geographical locations and the edges are spatial links, wherein each spatial link is a connection between two geographic locations and comprises one or more of three quality metrics: i) expected packet delivery rate, ii) expected mean Received Signal Strength, RSSI, if available, and iii) probability of the presence of vehicles in the connected locations;

each node, downloading said spatial connectivity graph from the spatial connectivity server;

using said spatial connectivity graph for ranking the utility of a node as a forwarder, wherein the utility is the minimum expected packet transmission count of the graph paths between current node and the destination node, or the utility is the maximum expected mean Received Signal Strength, RSSI, of the graph paths between the current node and the destination node, or the utility is the maximum expected probability of the presence of vehicles in the graph paths between the current node and the destination node.

An embodiment comprises each node replacing:

the quality metric of an edge of said previously aggregated and processed spatial connectivity graph, where the edge is a spatial link which is a connection between two geographical locations, with real-time collected data of said quality metric of said edge, when such real-time collected data is available for said connection between the two geographical locations.

In an embodiment, a geographical location is a spatial cell of predetermined fixed or variable size.

In an embodiment, the spatial cell is a rectangular area, in particular a square area, in particular a 50 m by 50 m square area.

In an embodiment, the utility of a node as a forwarder is calculated based on the spatial connectivity graph, comprising:

mapping both the current node's and destination node's locations into source and destination spatial cells in the spatial connectivity graph;

computing the path from source cell to destination cell with the minimum total expected number of transmissions from source node to destination node for each potential forwarder, using the packet delivery rate associated with each spatial link in the graph as the quality metric;

sorting the array of potential forwarders according to the minimum total expected number of transmissions from source node to destination node of the previously computed path for each potential forwarder.

An embodiment comprises each node replacing the expected number of transmissions necessary to deliver the packet between each pair of geographical locations in said edges of said graph with real-time collected data for each pair of geographical locations, when such real-time collected data is available.

In an embodiment, said CAM data records comprise, for each recurring period of time: a timestamp; the current node's own geographical location; the number of sent CAMs by the current node; the node IDs of the nodes that emitted the CAMs received by the current node; and the number and mean RSSI of said CAMs received by the current node.

The disclosure also includes a device for distributed multi-hop packet forwarding based on geographic coordinates for vehicular communications between nodes, each node comprising a geographical coordinate module comprising a data processing module configured to carry out any of the above methods.

The disclosure also includes a computer readable data carrier comprising the computer program instructions adapted to perform any of the above methods when said program is run on a data processor.

BACKGROUND ART

The present work builds upon a few key results within the field of wireless networks. The first is the observation that vehicular networks suffer from the gray-zone phenomenon, a problem that existing vehicular protocols do not address. Second, the idea that radio diversity can be used to opportunistically tackle unreliable channels has been proposed in the context of WLANs and mesh networks, but not in the vehicular network context.

The existence of a large gray-zone of partial connectivity in VANETs was first pointed out by Bai et al[3]. In their experiments they found the probability of having an intermediate packet delivery rate between 20 and 80% to be 50%.

Kaul et al[17] studied the effect of multi-radio diversity using antennas placed in different parts of a vehicle. In their experiments they reported a 10-15% packet error rate reduction by adding a second radio. Given that the antennas were placed very close to each other, this can be seen as a lower bound on the benefits of radio diversity on vehicular environments.

Most VANET routing protocols do not use diversity. Instead, they focus on a neighbor-based strategy of choosing a single relay per hop, differing mostly in the metric used for relay selection. GPSR [10], A-STAR [4] and Gytar [5] choose the neighbor closest to the destination, a risky choice given the gray-zone phenomenon present in VANETs. ACAR [12] uses a modified Expected Transmission Count (ETX) metric [18] that tries to minimize the end-to-end error probability. This is a good improvement but still has a single point of failure.

BLR [19] and CBF [20] are two VANET protocols where forwarding decisions are made on the receiver side. However, they are susceptible to replication and unable to limit the number of forwarders to reduce contention in high-density environments. DOT [21], establishes a prioritization, but does not limit the number of forwarders.

Diversity has previously been used in other contexts to recover from losses. Multi-Radio Diversity (MDR) [8] is a low-level scheme for WLANs where corrupt frames received at different APs are combined in a central node to try and extract a correct frame from the multiple corrupt copies. This scheme requires a shared channel to a central node, rendering it unsuitable for vehicular use.

Opportunistic routing has also been explored in the context of mesh networks, with the most prominent protocols being ExOR [6] and MORE [22]. Both leverage diversity by using multiple relays and both assume network-wide knowledge of channel quality between every pair of neighbors, which is reasonable for mesh networks but does not hold in VANETs.

PRO [7] is a distributed opportunistic scheme for infrastructure WLANs. In PRO, when a transmission fails, relays that have a good RSSI towards the destination opportunistically retransmit the packet on behalf of the source, increasing reliability. PRO requires nodes to learn the RSSI between all sources and destinations. While this is feasible in WLANs, all nodes in VANETs can be senders and receivers, plus channels are very dynamic. DAZL instead ranks relays based on distance rather than RSSI.

The idea of avoiding MAC layer contention by reducing the number of candidate transmitters first appeared as an answer to the broadcast storm problem [23]. Some schemes, such as SAPF [24] and P-persistence [25] use a simple probabilistic rule to control the number of forwarders, without prioritization. Slotting for spreading forwarders in time was introduced by Linda et al[26] and later used in Slotted p-persistence [25]. These approaches use a fixed number of slots and therefore cannot adapt to different node densities. Adaptive slotting based on workload and density has been proposed in some TDMA-based MAC protocols [27], [28], which are not compatible with 802.11p.

DISCLOSURE OF THE INVENTION

Multi-hop message forwarding based on geographic coordinates is a fundamental building block for vehicular communication. However, the unstable links and wide range of node densities make it challenging to design an algorithm suitable for vehicular use. A new forwarding protocol, herein referred as DAZL, combining three concepts in a novel way is introduced. First, multiple nodes cooperate in packet forwarding. Compared with traditional single relay schemes, this provides robustness against changes in topology and packet delivery rates. Second, network-layer slotting is used to control duplication and contention in high-density scenarios. Third, a distributed prioritization algorithm is used to opportunistically maximize hop length. Through both experiments and simulations, it is shown that the present disclosure provides improvements of up to 60% in throughput over single relay forwarding, while ensuring low latency and replication.

Vehicular Ad-Hoc Networks (VANETs) aim to improve land transportation by enabling novel applications in areas ranging from safety to traffic efficiency and infotainment. Many of these applications, such as internet access, sensor data gathering and cooperative car routing, require multi-hop communication for increased coverage [1]. While cellular is sometimes an option, vehicular networks provide advantages in terms of latency, bandwidth and cost, making efficient multi-hop communication an important problem.

Multi-hop packet forwarding in VANETs is challenging for two reasons. First, as a result of the vehicles' mobility, the rich scattering environment, and obstructions created by obstacles, link quality is highly variable [2]. This leads to very dynamic packet delivery rates and a large gray-zone of partial connectivity [3]. Second, node densities vary greatly, both in space and time, which calls for an adaptable protocol. When vehicles are sparse, forwarding must be aggressive to prevent packet loss. In contrast, in a traffic jam, forwarding must be conservative to avoid congestion collapse.

Previous work in VANET routing has focused on a single relay paradigm where, at each hop, a single neighbor is chosen to forward the packet. This approach is susceptible to the gray-zone phenomenon found in VANETs because it relies on the quality of a single link. Some protocols (e.g. [4],[5]) further aggravate this problem by choosing the longest possible hop, which, being at the edge of the radio range, tends to be the most unstable. Based on this observation, it is presented a new packet forwarding algorithm herein referred as DAZL for density-aware zone-based limited forwarding. The algorithm combines three key ideas in a novel way.

First, the presence of multiple vehicles within communication range can help address the link instability issue, because channels to different vehicles experience different fading conditions. To exploit this, DAZL nodes do not forward packets to a specific neighbor, but instead to a geographic region, or zone, and any vehicle in that zone can forward the packet. Since the next hop is not selected a priori by the sender, the forwarding operation can opportunistically use the best available channel. This will be referred to as "vehicle diversity". Second, through the use of a distributed prioritization algorithm, this approach can opportunistically give preference to forwarders closer to the destination, if they are available, thus reducing the number of hops. Finally, to deal with highly variable vehicle densities, DAZL is made density-aware. Specifically, in high-density scenarios, the fraction of vehicles that attempt to forward a packet is reduced, thus minimizing contention in the network.

DAZL combines the general ideas of diversity and opportunistic transmission, which have been used successfully in infrastructure and mesh networks, and applies them to the VANET context. Previous opportunistic protocols have relied on topology information [6],[7] and shared channels [8] for coordination, both of which are not available in VANETs. One of DAZL's key contributions is therefore a novel distributed and implicit relay coordination method that allows potential relays to cooperate while reducing replication and interference.

BRIEF DESCRIPTION OF THE DRAWINGS

The following figures provide preferred embodiments for illustrating the description and should not be seen as limiting the scope of invention.

DETAILED DESCRIPTION

Link Instability

Figure 1:
FIG. 1: Depicts existing neighbor-based forwarding proposals. These have trouble coping with link instability and variable node densities.

Traditional routing schemes build on the premise that nodes have a fixed or slowly changing set of neighbors and that neighbors are well connected to each other. However, measurements have shown that these assumptions do not hold for VANETs, where topology changes quickly and links are often poor. The reasons for this instability stem from the combination of a rich scattering domain with high mobility. Depending on location, roads can be lined with trees, buildings and mounds that scatter the signal and create multipath effects that change quickly with even small movements, resulting in large fluctuations in link quality. Node movement also leads to changes in shadowing conditions. For example, when a vehicle turns the corner of a building, its signal is immediately attenuated [2]. Moreover, even when nodes are stationary, changes in line of sight conditions can affect communication. For example, in FIG. 1, a tall truck is about to come in between nodes a and b, blocking their line of sight.

Traditionally, the path between source and destination is defined as a sequence of specific nodes. In the example in FIG. 1, cars a, b and c making up the path are shown as marked (a, b, c). Path selection strategies vary. In periodic routing schemes, routes are precomputed and next hops stored in a routing table. In source based routing, e.g. [9], the path is selected by the source, and stored in the packet header. These strategies are problematic because routes quickly became obsolete in the dynamic VANET environment. With geographic routing, e.g. [10], the next-hop is selected by the previous node based on its neighbors' and the destination's coordinates. This on the fly relay selection makes geographic forwarding more adaptive, and a popular choice for vehicular protocols.

Recently, Bai et al[3] observed that, unlike other environments, vehicular does not have a large transmission range within which reception is (near) perfect. Instead, most of the radio range is a gray-zone with intermediate packet delivery rates. In other words, there are very few good links in VANETs, and the ones that are, tend to be short and thus unattractive for forwarding. Because of this, relying on a single next-hop node to forward a packet, like existing protocols do, is dangerous. It is proposed to address this problem by leveraging "vehicle diversity": allowing multiple vehicles, subject to different fading conditions, to cooperate in forwarding packets. Vehicle diversity is further detailed in "vehicle diversity" and "zone-based forwarding protocol".

Hop Length Tradeoff

The link instability encountered in vehicular networks makes the selection of a good next hop difficult. Geographic routing is a good option since the choice is made as late as possible. Note, however, that any protocol faces a fundamental tradeoff. Picking a nearby node results, on average, in a higher packet delivery rate, but it will require more hops to reach the destination. Picking a more distant node reduces the number of hops, but lower channel quality will result in increased losses, and thus more retransmissions. It may also increase interference losses, e.g. as a result of hidden terminals. Because of this, managing this tradeoff to optimize throughput is difficult.

It is proposed to address this problem by prioritizing vehicles. In our solution, nodes closer to the destination are given priority, but nodes closer to the sender step in when no such long-range nodes are available. This maximizes hop length without compromising reliability. "Forwarder prioritization through ranking" provides more details.

Variable Node Densities

Traffic density varies greatly in space and time. Bai et al[11] reported inter-vehicle spacings for a Toronto freeway ranging from 6 to 500 meters, depending on the hour of the day. Different densities can even be found simultaneously on the same road, e.g. due to road work—FIG. 1.

Low-density scenarios are susceptible to network partitioning, which is usually addressed through store and carry procedures. High densities create another class of problems. For example, the more vehicles there are, the more messages are likely to be sent, increasing congestion. This will create interference losses that will further compound the previously mentioned link instability issue, and it can even lead to collapse if the high load cannot be handled by the 802.11p backoff mechanism. Network-layer protocols have to adapt and control the burden placed on the MAC layer.

Some proposals (e.g. [4],[12]) have actively tried to guide packets towards dense regions in an attempt to increase reliability; while this may be effective in low density scenarios, it is problematic when node densities are high. This issue is tackled by limiting the number of potential forwarders and spreading them in time, as explained in "Forwarder coordination through slotting".

Protocol Design—Vehicle Diversity

In traditional forwarding algorithms, packets are forwarded to a specific next-hop node, which is problematic in VANETs: since links have large gray zones, very few links (other than very short ones) are stable. To counter this, DAZL uses zone-based forwarding, a new paradigm in which packets are forwarded not to a specific node but to a geographic zone located between the previous hop and the destination—FIG. 2. Any car in the zone can then forward the packet. Due to their physical separation, nodes will experience different fading, line of sight and interference conditions, so having multiple potential forwarders decreases the likelihood of packet loss.

In order to assess the potential gains of vehicle diversity, an experiment was performed where a parked vehicle acted as a sender while 3 receivers drove a circuit around it, keeping close together and exchanging positions periodically like cyclists riding in a group. The vehicles were equipped with NEC LinkBird-MXs, a platform for IEEE 802.11p-based vehicular communications [13]. One hundred 500 byte messages were sent every second at a data rate of 6 M bps and a transmit power of 18 dBm in a 10 MHz channel centered at 5.9 GHz.

Figure 3A:
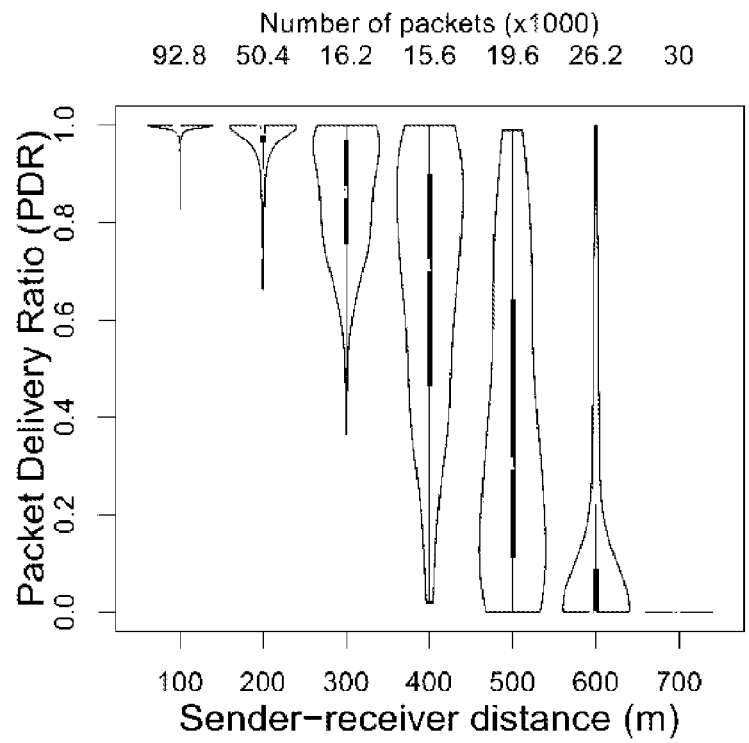
FIG. 3: Depicts the importance of vehicle diversity as a way to overcome channel variability, as calculated from experimental data. Shows that combining multiple receivers yields significantly better performance.
 (a) Represents the Packet Delivery Rate (PDR) of a single receiver.
 (b) Represents the combined PDR of 3 receivers.
 (c) Represents the mean PDR for different receiver combinations.
 (d) Represents the diversity gain obtained from additional receivers.
Figure 3B:
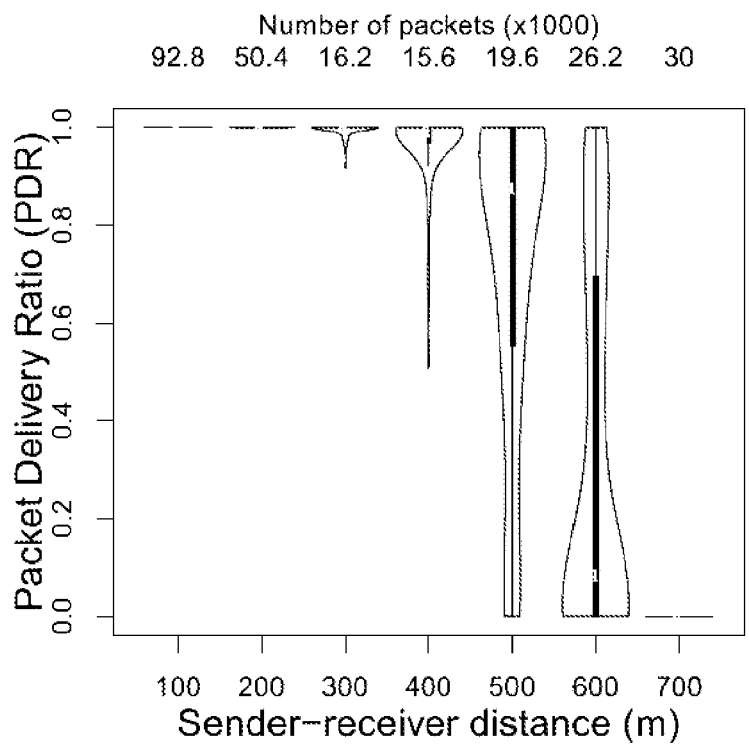

FIG. 3a shows a violin plot of the Packet Delivery Rate (PDR) of the first receiver, r1. PDR is sampled every second and samples are grouped into 100 m sender-receiver distance bins. The violin plot combines the median and quartiles from a boxplot with a kernel density plot, allowing us to see both the distributions' shape and main parameters. A large gray-zone of partial connectivity can be observed, with intermediate PDRs between 300 and 600 m. In FIG. 3b it can be seen what happens when a packet is considered delivered as long as at least one of the three receivers is able to decode it. The reduction in the gray-zone's size is clear, with partial connectivity being observed only in the 500 and 600 m distance bins.

Figure 3C:
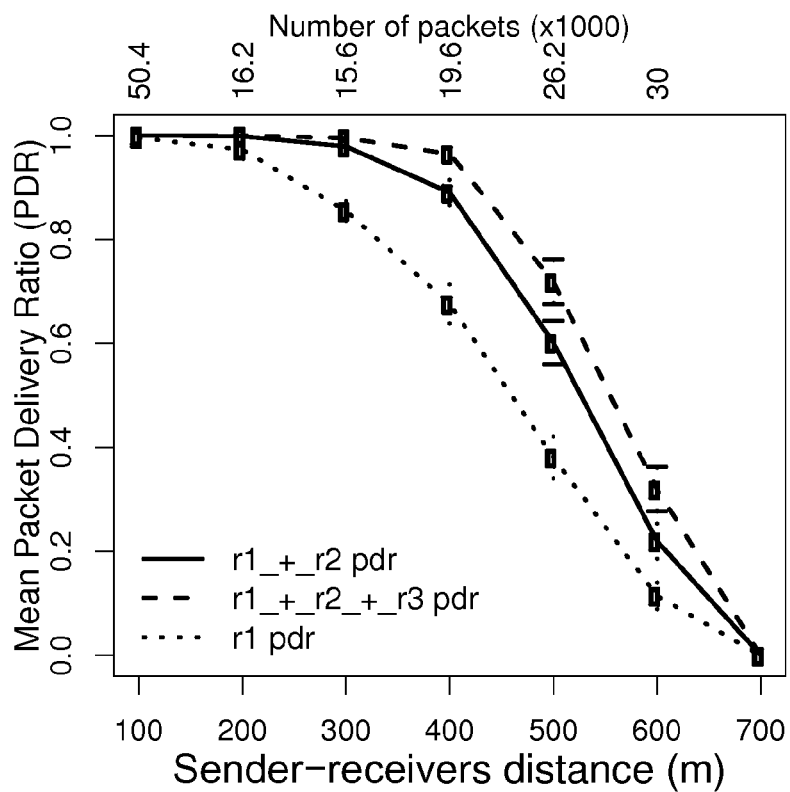

The mean PDR for 1, 2 and 3 receivers is plotted in FIG. 3c as a function of distance. Going from a single receiver r1 to 2 receivers, r1+r2, provides a 20% PDR increase. A third receiver, r3, adds an additional 10%.

Figure 3D:
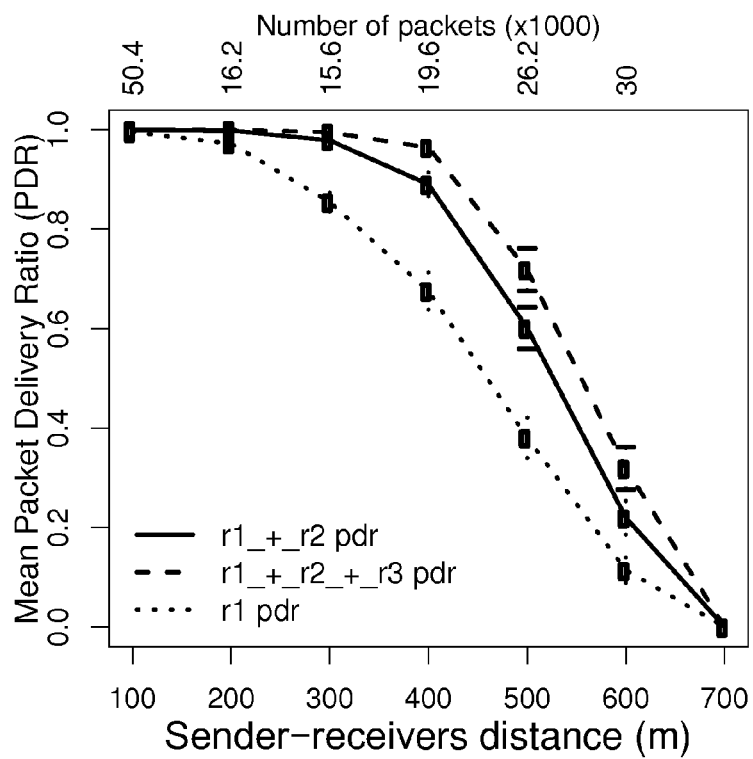

Diversity gain is defined as the ratio of messages that can be recovered due to vehicle diversity divided by the number of messages lost by the reference receiver, r1. FIG. 3d shows this gain as a function of distance. Adding r2 allows the system to recover at least 75% of losses up to 400 m. Adding r3 to r1 and r2 eliminates 95% of all losses up to the same distance.

These results show that there are significant benefits to be had by a protocol that is able to exploit vehicle diversity. Next, such a protocol is described.

Protocol Design—A Zone-Based Forwarding Protocol

DAZL, for Density Aware Zone-based Limited forwarding, is a geographic forwarding protocol that uses zone-based forwarding to overcome the gray-zone phenomenon. In this section the high-level algorithm is presented, while the following ones provide further detail on each individual component.

It is assumed that nodes know their own coordinates and are able to obtain their one-hop neighbors' coordinates from periodically broadcast beacons [14]. The destination should be location-addressable through prior knowledge or a location service [15]. The packet header stores three addresses: original source, destination, and the forwarder ("previous hop") that sent the packet. Each address includes both node identifier and geographic coordinates for the car. At each hop, each vehicle receiving the packet executes the following protocol:

Based on its position and the header information, check whether it is closer to the destination than the previous hop. If it is not, drop the packet.

Run a ranking algorithm to compare its utility as a forwarder with the utility provided by other potential forwarders in its neighborhood.

If the node is thought to be one of the n best potential forwarders then it is said to be in the forwarding zone. Otherwise, it drops the packet.

If the vehicle is in the zone, it waits for a period of time inversely proportional to its rank before forwarding the packet. This is called rank-based slotting.

If, while in the waiting state, the vehicle overhears another vehicle forwarding the packet, it learns that its transmission is not needed and cancels the operation.

The implicit acknowledgment scheme in the last step is also used by the previous hop to learn about the forwarding operation's success. Losses are detected by a timeout and handled through retransmission. If nodes do not hear each other's forwardings, replication can occur. To mitigate this issue DAZL implements a simple duplicate suppression scheme. Each node keeps a history of overheard messages and uses it to check whether incoming messages should be dropped.

As more receivers are added in high-density scenarios, increased contention starts to negate the benefits of vehicle diversity. DAZL controls this tradeoff by limiting the amount of forwarders to a number n, a parameter. If n is set to say, 5, both it be reliability in low-density scenarios and contention reduction in high-density situations can be achieved.

The distributed ranking algorithm used by DAZL allows nodes to coordinate without explicit communication, reducing overhead. The ranking also serves as a prioritization mechanism that enables hop length (i.e. distance travelled) to be maximized. The delay introduced at the forwarding level, in addition to the limit number n of forwarders, work to reduce replication and contention in high-density situations. These mechanisms are further detailed below.

The forwarding protocol here described is able to forward packets along a road between source and destination coordinates (e.g. in a highway). More complex topologies can be supported by the addition of more detailed path information to the routing header, e.g. a sequence of roads to traverse.

Protocol Design—Forwarder Coordination Through Slotting

While the redundancy introduced by zone-based forwarding is inherently beneficial in sparse areas, the challenge posed by high densities must be addressed. If too many nodes inside the forwarding zone try to forward simultaneously, 802.11p's backoff mechanism may not be able to avoid high packet collision rates. Moreover, having too many forwarders may increase duplicates, adding unwanted load on the network.

The 802.11p MAC Distributed Coordination Function (DCF) already implements some basic coordination for us. In DCF, nodes that detect a busy channel execute a backoff procedure in which each node randomly chooses a slot from a contention window with (typically) 16 slots and awaits its turn. If the channel is now found to be free, the packet is sent. Otherwise, the procedure is repeated. While this is sufficient to avoid collisions between a modest number of nodes, it is not sufficient in dense scenarios. Moreover, MAC-layer slots are so short that they do not allow enough time for nodes that are waiting to forward to overhear other forwarders' transmissions and cancel theirs. Finally, they do not provide prioritization.

Figure 4:
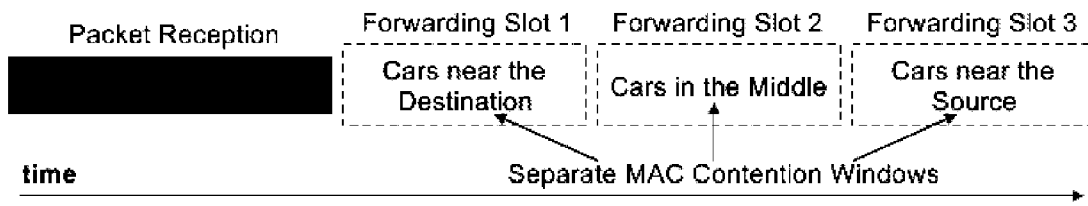
FIG. 4: Represents how slotting spreads potential forwarders in time according to their location in order to control channel contention.

The present solution is to introduce an additional level of slotting at the network layer. DAZL divides the time after a packet reception into a number of forwarding slots—FIG. 4. Potential forwarders distribute themselves over the slots without explicit coordination. The duration of each slot is an important parameter. If the slots are too long, latency will suffer. If they are too short, nodes in different forwarding slots may still contend at the MAC level if their contention windows overlap. Ideally, slots should be just slightly longer than the average MAC layer contention window so that nodes in different slots do not compete but also do not wait around needlessly.

Protocol Design—Forwarder Prioritization Through Ranking

Long distance hops are desirable because they mean fewer hops to reach the destination, and consequently, lower latency, traffic load, and interference. Therefore, it is desirable to prioritize the nodes closest to the destination. However, when these nodes do not receive the packet, nodes further away should step in to ensure reliability, effectively addressing the hop length tradeoff pointed out above.

DAZL achieves prioritization through a smart assignment of nodes to forwarding slots: nodes close to the destination get the first slots, while nodes further from it get later ones. This is accomplished as follows. Based on periodic beacons [14], nodes build a table with the locations of their one-hop neighbors. Also, the previous hop's coordinates and expected radio range are included in the packet header. Each potential forwarder then executes the following procedure:

Define the set of expected forwarders $ES_{f,m}$ for message m, which is composed of the nodes that are both closer to the destination than the previous hop and within its radio range.

Build an array r from the set $ES_{f,m}$. Now sort r according to each node's distance to the destination. The index i at which a node appears in r is now its rank.

For each node in $ES_{f,m}$, assign it a forwarding slot s=ceil(rank/nps), where rank is the node's rank and nps is the number of nodes per slot, a protocol parameter. Wherein ceil(x) is the value of the smallest integer not less than x.

The last rule ensures that the first forwarding slot is taken by the node providing the most forward progress towards the destination, in terms of distance. The nps parameter controls a tradeoff between replication and latency: if more nodes are allowed per slot, the expected latency decreases while replication increases. Also note that nodes with ranks larger than the limit number of forwarders n refrain from forwarding to avoid excessive replication.

Figure 2:
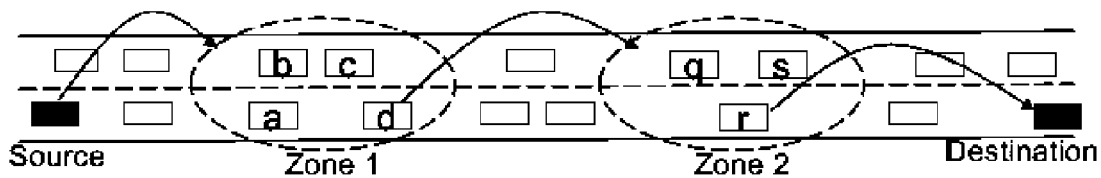
FIG. 2: Represents the proposed embodiment, where forwarding is based on geographic zones rather than specific nodes.

Let us use FIG. 2 to go through an example. For simplicity, assume that the forwarding zones are defined as pictured, that each node within a zone has all the other nodes in the same zone in their neighbor table, and that each node gets its own forwarding slot (nps=1). Consider, as an example, that in the first hop the set of nodes that receive the packet is $AS_{f,m}=\{a,b,d\}$. Note that these nodes do not know that c lost the packet, so they will include it in their ranking, making $ES_{f,m}=\{a,b,c,d\}$. Ordering the nodes according to their distance to the destination, every node will reach the same ranking r=[d,c,b,a]. Now, node d will be assigned the 1st forwarding slot and c, b and a the 2nd, 3rd and 4th slots, respectively. Realizing that it was assigned the 1st slot, node d will immediately forward the packet. Nodes a and b will then overhear d's packet and cancel their own forwardings, avoiding any duplication.

Note that the algorithm is robust regarding small variations in rankings calculated by different nodes because forwarders in the same slot will still backoff at the MAC layer. Also, GPS errors are not critical to the protocol's operation. Their effect is limited to generating sub-optimal rankings.

Results and Embodiments of the Disclosure

DAZL is compared with a traditional neighbor-based protocol that follows a geographic routing approach. The node holding the packet leverages local neighborhood knowledge, acquired through periodic beaconing, to choose a next hop before sending the packet. As mentioned earlier, picking a next hop involves a difficult tradeoff between delivery rate and distance.

A protocol that uses a conservative algorithm based on a metric that combines both forward progress and reliability was implemented. Specifically, it is chosen, at each hop, the node that is closest to providing 50% of the forward progress given by the neighbor closest to the destination. For example, a node with three neighbors, a, b and c at 200, 100 and 50 m, respectively, will choose b as the relay. The value of 50% was taken from the results in FIG. 3c, where the PDR of a single receiver remained under 80% in the second half of the communication range. Neighbor-based forwarding using a greedy approach, which picks the neighbor closest to the destination, and a random approach, using a random neighbor, were also evaluated but their performance was consistently very poor.

An optimal oracle zone-based protocol was also implemented to allow to test how close DAZL gets to an idealized protocol with access to perfect and global information. The oracle-based protocol works as follows:

The currently selected node (initially the source) broadcasts the packet.

Every node in the network tells the oracle whether they have successfully received the packet or not.

Once the oracle has heard from all nodes it chooses the receiver closest to the destination to be the forwarder.

As this protocol cannot be implemented in practice, it is only considered in the simulation evaluation.

The experimental evaluation is limited to a small five-node setup. Later in this document, simulations are used to evaluate DAZL in larger topologies.

Figure 5:
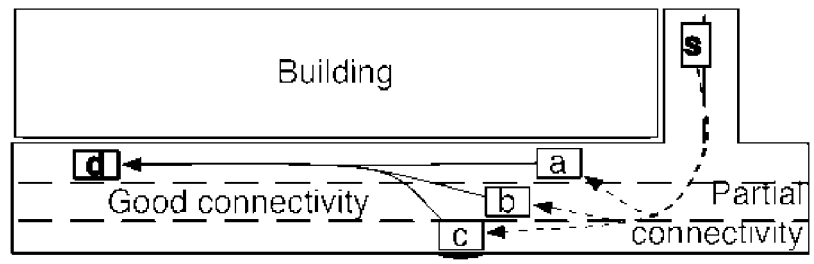
FIG. 5: 2-hop network topology used the embodiment's experimental evaluation.

Buildings are known to have a significant negative impact on VANET communication [2],[16]. DAZL was experimentally evaluated under such conditions using the setup in FIG. 5. The source and destination cars are parked on two adjacent sides of a building and are unable to communicate directly. However, the three nodes close to the corner of the building can help by forwarding packets.

Each vehicle is equipped with a NEC LinkBird-MX [13] compatible with the IEEE 802.11p standard. Due to the platform's limitations, the protocols are implemented as an application running on a laptop connected to the Linkbird through ethernet. This means packets must travel across two protocol stacks and over the wire. This has two main implications for DAZL. First, overall latency will suffer. Second, overheard packets will take longer to process, increasing the likelihood of unnecessary replication. To mitigate this, it longer 25 msec forwarding slots were used, giving the protocol more time to process overheard packets.

The conservative neighbor-based protocol will pick the node closest to half of its radio range, which in this case is a. DAZL was configured to allow up to 3 forwarders (n=3), one per forwarding slot (nps=1). Retransmissions were disabled for all schemes, in order to highlight the differences in robustness between the protocols. The system configuration parameters are summarized in Table I. For each protocol, 100,000 messages were sent at a rate of 250 per second (mps).

TABLE I

Linkbird configuration parameters.

| Parameter | Value |
| --- | --- |
| Center frequency (MHz) | 5900 |
| Bandwidth (MHz) | 10 |
| Data rate (Mbps) | 3 |
| Tx power (setting, dBm) | 5 |
| Antenna gain (dBi) | 6 |
| Data packet size (Byte) | 256 |
| Beaconing frequency (Hz) | 1 |

Figure 6A:
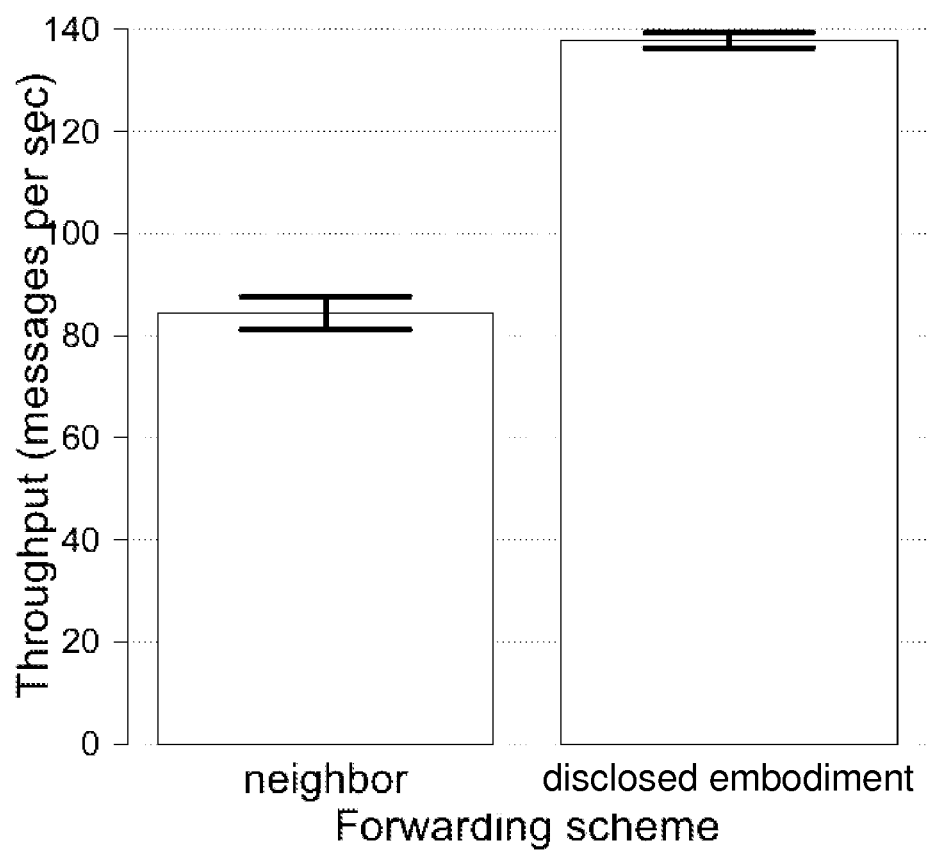
FIG. 6: Proposed embodiment's experimental results.
(a) Throughput.
(b) End-to-end latency.
(c) Number of replicas observed at the destination.
(d) Relay diversity.

FIG. 6a compares the mean throughput achieved by DAZL against neighbor-based forwarding in messages per second. The 95% confidence intervals are shown by means of ranges. Because the neighbor-based scheme chooses a single relay, its performance is severely affected by losses on the source-relay link. In fact, it only manages to get 84 mps to the destination, 33% of the source rate. DAZL, on the other hand, does not rely on any single node. It is able to leverage multiple relays and separate them into different forwarding slots. This results in a throughput improvement of 63% to 137 mps.

Figure 6B:
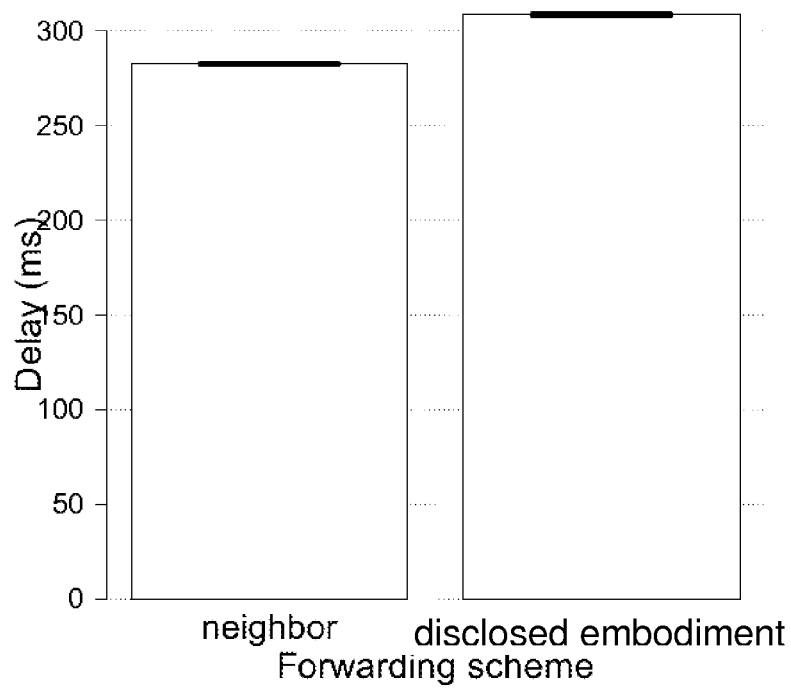

FIG. 6b shows the mean end-to-end latency for the two protocols. Because of the platform limitations, the absolute values are larger than they would be in a production environment. In relative terms it a delay increase of around 25 msec is seen when moving from neighbor- to zone-based forwarding. This is due to the latency introduced by slotting. In a production version, the latencies would be a lot lower: the protocol stack would be implemented by a single device, allowing for much shorter slots, e.g. a few hundred microseconds.

Figure 6C:
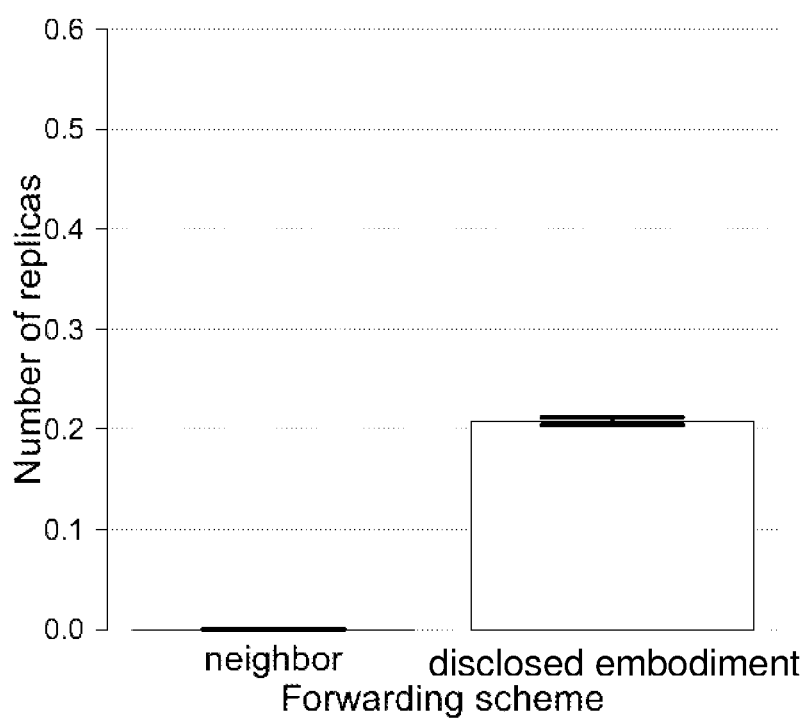

FIG. 6c shows the mean number of replicas observed at the destination. Because retransmissions due to message losses were disabled, the neighbor-based protocol generated no replication. DAZL generated, on average, 20% replication. This number is artificially high because of the radio set up on the Linkbirds. When a node overhears a forwarded packet from another relay, it should refrain from forwarding. This is done by having the forwarding protocol tell the MAC to drop the now redundant message from its transmit queue. However it was not possible to alter the MAC layer on the Linkbirds to do this, which results in duplicate packets. Production systems will use a single stack implementation of DAZL, which does not have this problem. The simulator also implements forwarding cancellation correctly.

Figure 6D:
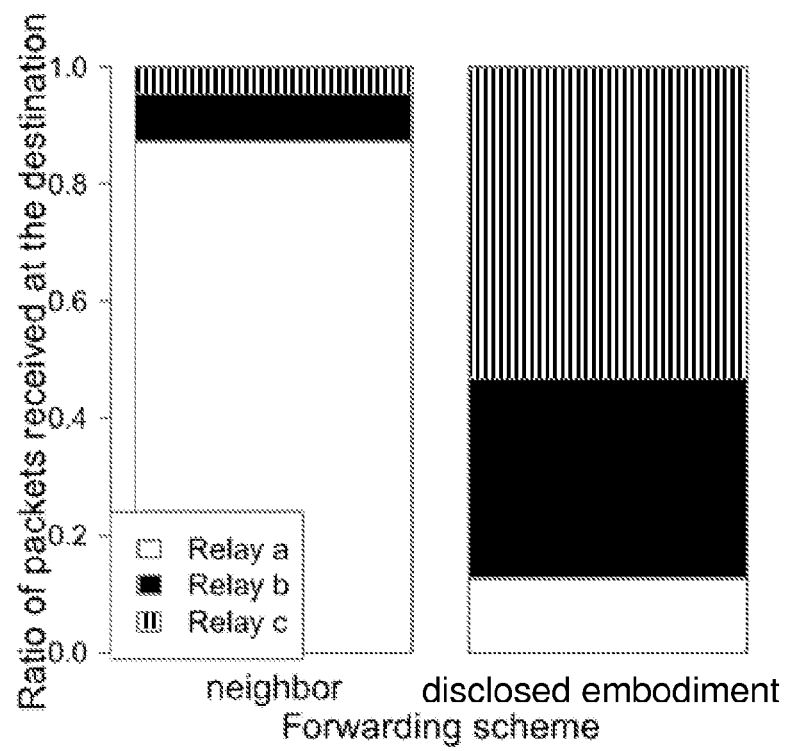

Finally, vehicle diversity: from all the packets reaching the destination, ratio coming from each of the relays and plot is depicted in FIG. 6d. The conservative neighbor-based scheme chooses a roughly 90% of the time. The 10% attributed to relays b and c is due to node a occasionally loosing connectivity with the source.

DAZL assigns slots based on the distance to the destination so node c gets the 1st slot, b the 2nd and a the 3rd. Node c has the highest priority and accounts for around 50% of the packets at the destination. Node b accounts for 40% and node a 10%, values that are consistent with their slot assignments.

These results highlight the benefits of the DAZL scheme, even when only a few forwarders are available.

Regarding the simulation evaluation, the ns3 simulator with 802.11p support was chosen for a larger scale evaluation. The simulation parameters are presented in Table II.

TABLE II ns3 configuration parameters.

| Parameter | Value |
| --- | --- |
| Center frequency (MHz) | 5900 |
| Bandwidth (MHz) | 10 |
| Data rate (Mbps) | 3 |
| Tx power (dBm) | 16 |
| Fading model | Nakagami, m = 1.5 |

Nodes were placed on a 1 Km-long road according to an exponential distribution representative of an actual highway [11]. Inter-vehicle average distances ranging from 80 (sparse but connected) to 10 meters (traffic jam) were used. A sender at one end of the road sends 322 byte data packets at a rate of 200 per second to a destination at the other end. The maximum number of retransmissions was set to two. DAZL forwarding slots are set to 2 ms, with one node per slot (nps=1). The number of forwarders was limited to 7 and the expected range set to 150 m. Neighbor discovery was performed using 1 Hz beacons. Results are averaged over five 60 second runs with different random seeds.

FIG. 7 compares DAZL's performance with that of the conservative neighbor-based and oracle zone-based protocols previously described. The vertical lines and hash marks represent the 95% confidence intervals, where available.

Figure 7A:
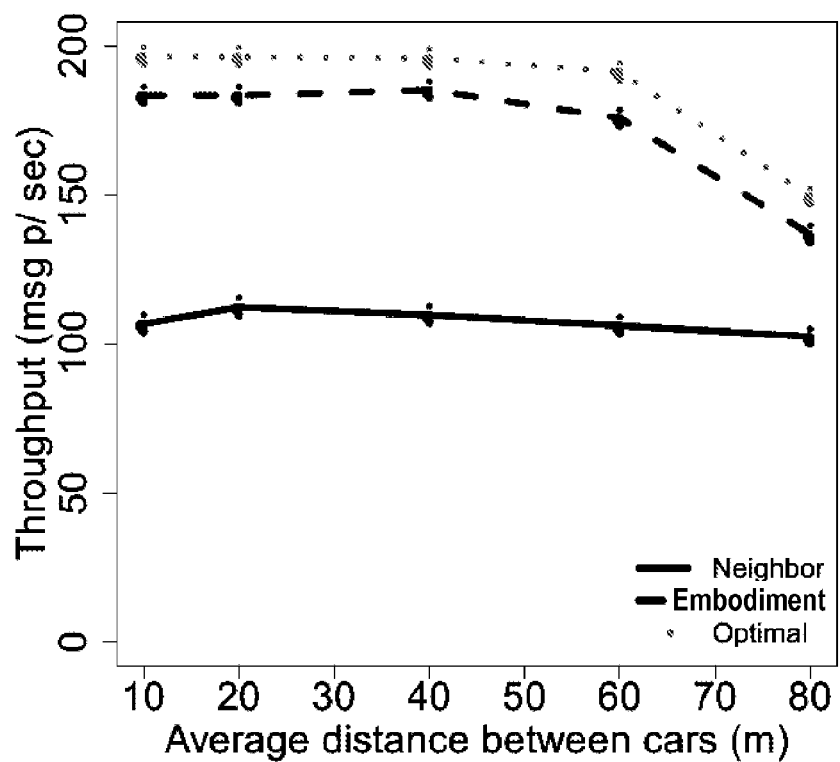
FIG. 7: Proposed embodiment's simulation results.
(a) Throughput.
(b) End-to-end latency.
(c) Number of replicas observed at the destination.
(d) Candidate vs actual forwarders for the proposed embodiment (10 m inter-vehicle spacing)

FIG. 7a shows the throughput for the three schemes. The neighbor-based protocol hovers around 110 mps (55% of the source rate). This is the result of packets losses: 45% of the time the selected next-hop is unable to receive the message successfully. The oracle scheme, however, does not rely on any specific node: it works as long as at least one node, any node, receives the packet. Due to this it gets very close to the source rate of 200 mps. DAZL goes up to 185 mps, which is within 10% of the oracle protocol. The reason is that it can use up to 7 potential forwarders. Also, the fact that DAZL's throughput does not decrease at higher densities shows that slotting and the limited number of forwarders are effective in preventing excessive contention and losses.

Figure 7B:
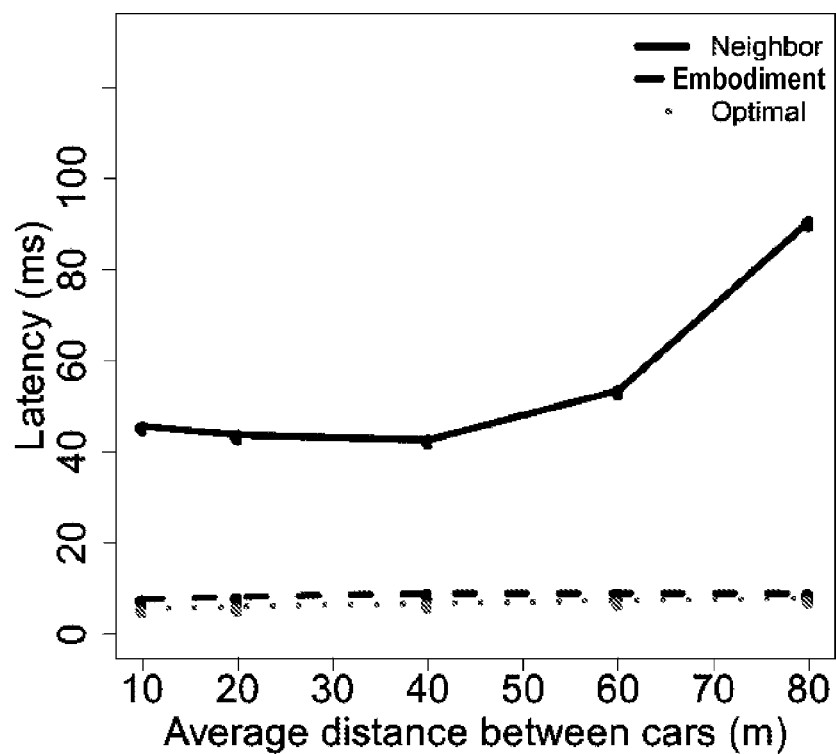

FIG. 7b shows end-to-end latency for all protocols. DAZL performs very similarly to the oracle protocol. Both have latencies below 10 msec and the results are fairly consistent across densities. This indicates that the small delay introduced by DAZL through slotting does not impact overall latency significantly. Also, DAZL's built-in redundancy results in significantly lower latencies compared with the neighbor-based protocol. The reason is that neighbor-based forwarding results in more packets losses, and thus in a lot of retransmissions. These are very costly not only because of the additional transmission time, but also because the node has to wait before finally timing out and retransmitting.

Figure 7C:
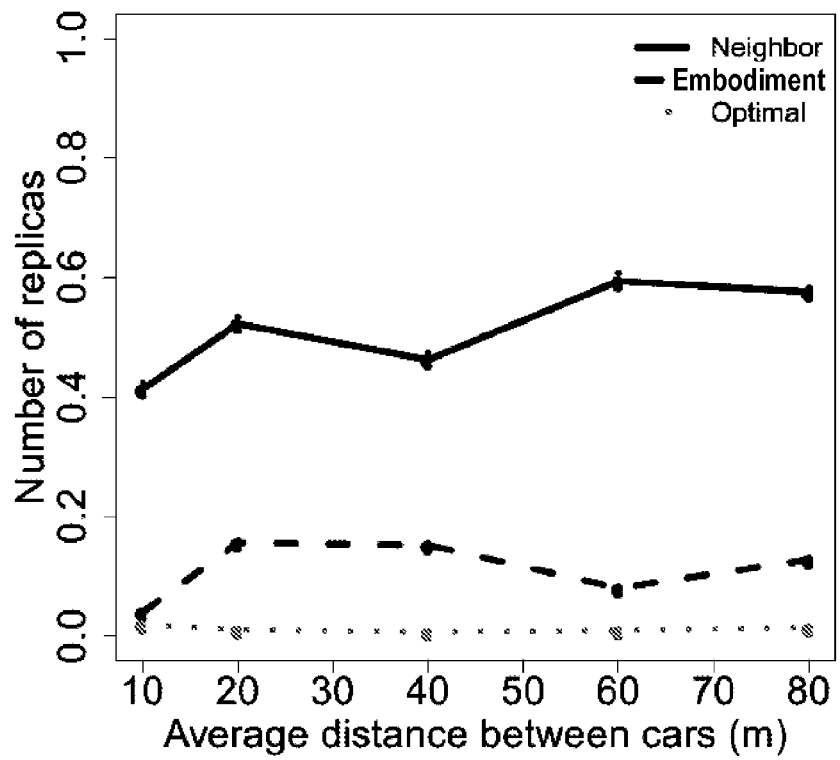
Figure 7D:
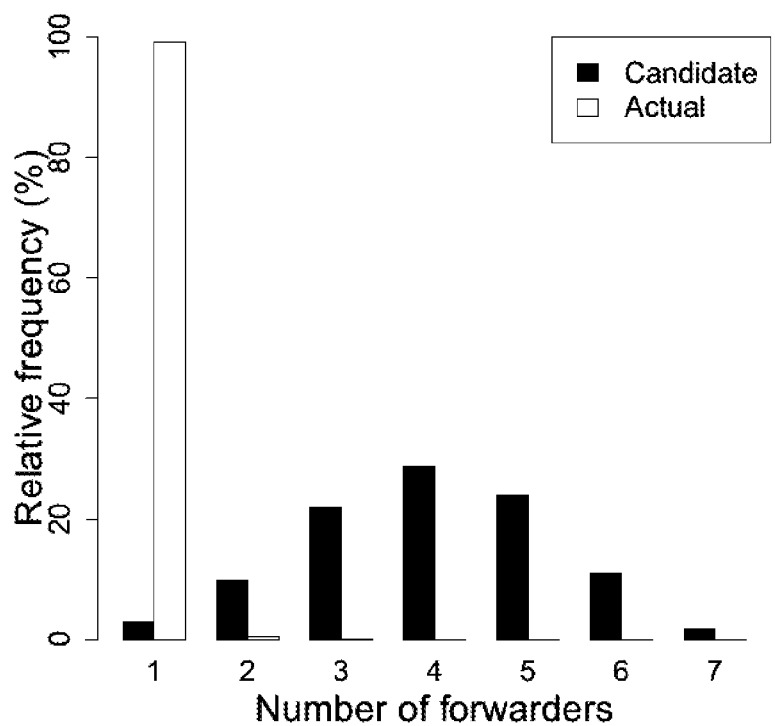

FIG. 7c shows the number of replicas observed at the destination. As expected, the oracle protocol does not generate any replicas. On the other hand, the neighbor-based scheme generates a significant amount of replication of up to 60% due to losses. Because the packet delivery ratio between previous hop and forwarder is not perfect, sometimes the former doesn't hear the forwarding done by the latter, leading to spurious retransmissions.

DAZL generates replication when the potential forwarders fail to hear each other. Replication is well contained however, never going beyond 18%. This is due to the employed cancelation mechanism, whose operation can be observed in FIG. 7d. This graph compares the number of potential forwarders with the number of actual forwarders for the 10 m inter-vehicle spacing scenario. Here it can be observed that 97% of the time, there are two or more potential forwarders, a situation that could lead to replication. However, 99% of the time there is only one actual forwarder, which proves the effectiveness of our scheme.

The results here presented clearly demonstrate the advantage of zone-based forwarding in vehicular wireless networks. DAZL performs almost as well as the oracle protocol while using only local information and a distributed algorithm.

Further and/or Alternative Embodiments

The above methods are especially useful for scenarios such as highways, where packets can follow the road profile more or less in a straight line to reach the destination. However, the above methods can be improved for urban environments with intersections and obstacles such as buildings. In urban environments the spatial corridor through which the packet should be forwarded to reach the destination may diverge significantly from a straight line, depending on radio connectivity, which is severely conditioned by both road network topology and terrain topography.

Traditionally, geographic VANET urban routing protocols have road maps to assist them in selecting a sequence of roads from source to destination through which packets are to be forwarded (e.g. GSR, SAR, GvGrid). Some also add statistical traffic information to help select better-connected roads, increasing the probability of delivery (e.g. ACAR, Gytar).

Figure 8:
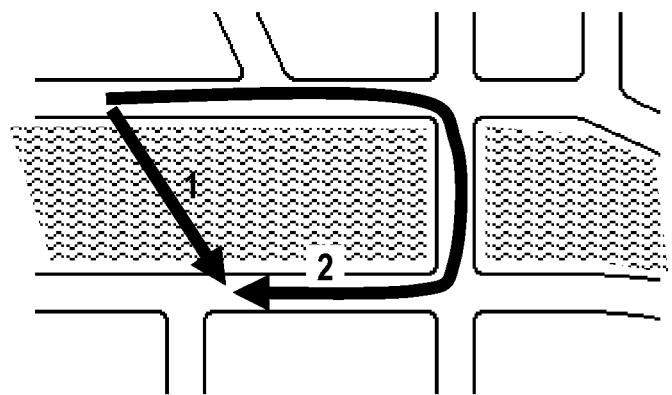
FIG. 8: Spatial corridors chosen by different protocols. The proposed embodiment recognized packets can hop across the river to choose the shorter path (1). Prior art roadmap-based protocols ignore this, choosing a longer path (2).

The roadmap based strategies GSR, SAR, GvGrid, ACAR and Gytar have a potential improvement: they assume that radio connectivity exactly mimics the road topology, while in reality, terrain topography is just as important. For example, in FIG. 8 there is a river with roads on both banks. A roadmap-based protocol (2) would choose a long-winded corridor that uses a bridge to cross the river, similar to the route a car traveling from source to destination would take. However, this ignores the fact that packets can cross the river at any point, as long as the other bank is within radio range. This realization leads to a much shorter and optimized, spatial connectivity-based protocol (1).

This protocol according to the present disclosure uses spatial connectivity information to select better forwarding corridors for packets in urban environments.

Cooperative Awareness Messages (CAMs), the previously mentioned periodically broadcast beacons, are messages containing both the sender's position and velocity vector. These are sent periodically by every node so that each node has an understanding of their current network neighborhood, for example as defined in Intelligent Transport Systems (ITS) by ETSI or in DSRC.

In this development it is proposed to leverage these CAMs for collecting spatial connectivity information. CAMs are attractive because they contain the sender's location and, being part of the standards, can be used without creating any additional overheard. Alternatively, any other type of message containing the sender's location can be used, in particular if the message is a broadcast message.

Figure 9:
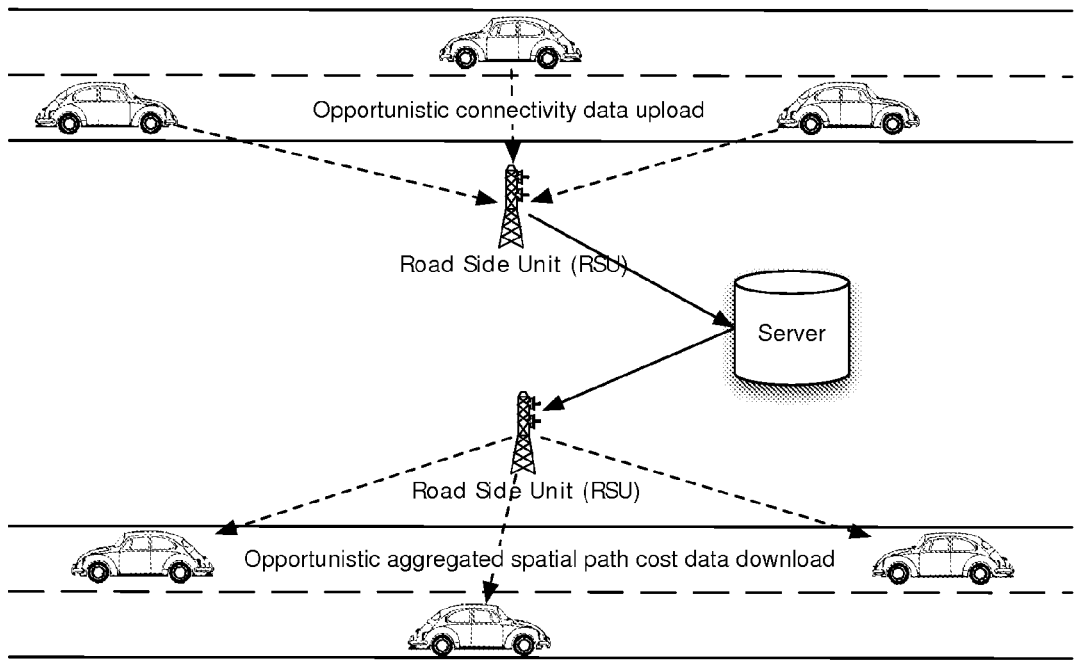
FIG. 9: High-level data flow for the collection and distribution of spatial connectivity information, wherein the server combines spatial connectivity data from all data collecting-nodes and computes statistical spatial path costs.

Geo-referenced information about received CAMs can be collected over a period or periods of time and opportunistically uploaded by each node to a server (for example when passing by a Road-Side Unit (RSU)). Aggregated data from multiple vehicles can be combined and processed by the server to obtain a statistical spatial connectivity map for a region or city. This map can be modelled as a graph where nodes represent spatial locations and edges the quality of the radio connectivity between them in terms of packet delivery rate, signal strength and/or probability of vehicles being present. In this text, spatial links is used as a synonym for an edge in this graph. The graph is then opportunistically downloaded by vehicles for use in the routing protocol (again, for example, when passing by RSUs). This is a feasible proposition because topography, and therefore average spatial connectivity, changes slowly, making infrequent updates sufficient. The overall data flow is depicted in FIG. 9.

Figure 10:
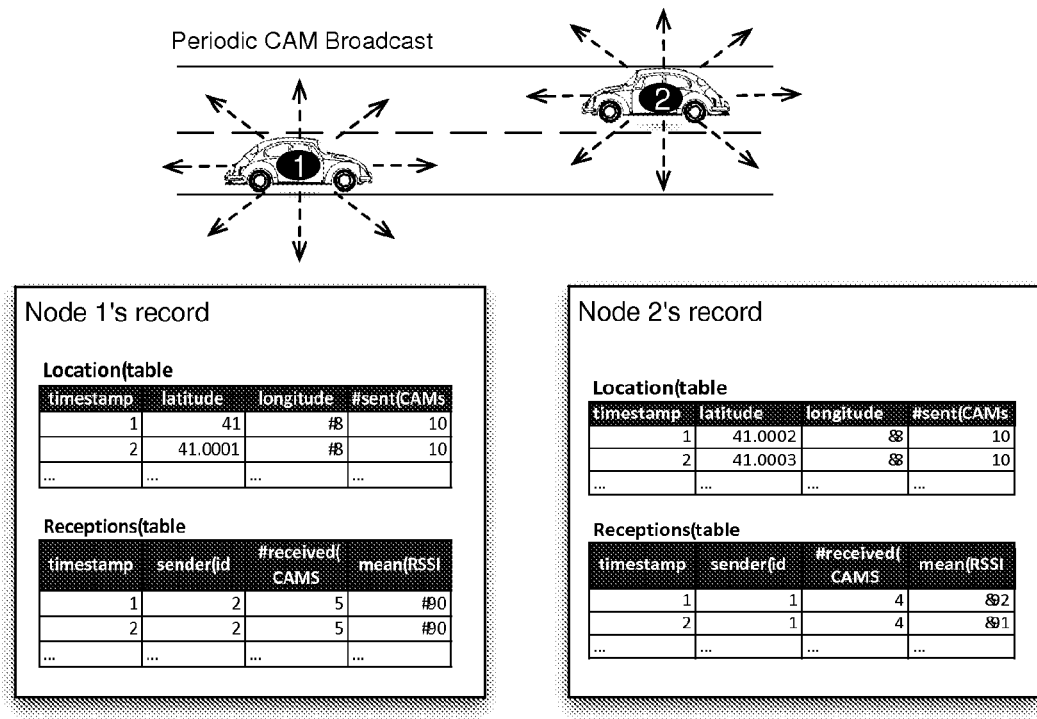
FIG. 10: Data structures used by nodes to record spatial connectivity information.

The data collected by each node for uploading to the server is now described, with the help of FIG. 10. Using a GPS (or functionally equivalent) receiver, each node keeps a location table where it registers its coordinates for each timestamp. The number of sent CAMs is also stored in each entry. The timestamp's resolution dictates the level of granularity used. For example a 1 Hz GPS receiver allows nodes to have, at most, one separate entry per second. By using this timestamp data and aggregating data at the server according to such timestamp, the collected CAM data can be simplified thus reducing workloads on the vehicle nodes.

Besides the location table, each node also keeps a CAM receptions table. This table's primary key is a (timestamp, sender_id) pair. Each line describes the number of CAMs originating from node sender_id received in the specified timestamp. The mean RSSI for these CAMs is also stored.

When passing by an RSU, nodes can simply and compress these two tables and upload them to a server listening at a known address. Upon receiving data from multiple nodes, the server can use the GPS timestamps, which are synchronized across nodes, to join the location and reception tables and learn:

(1) Which spatial links exist. A spatial link is a pair of locations (L1,L2) such that if node a is at L1 and node 2 is at L2, there is a non-zero probability that they will be able communicate.

(2) By dividing the number of received CAMs by the number of sent CAMs, the expected PDR for each spatial link can be deduced, and/or (3) By averaging the RSSI data the expected signal quality for each spatial link can be deduced, and/or (4) For each spatial link (L1,L2), and using the nodes' location tables, the server can compute the probability that there will be at least one node in both locations L1 and L2 simultaneously. This is effectively the probability that the link will exist.

In order to simplify calculations, latitude and longitude coordinates can be mapped onto a discrete grid (for example a square grid of 50×50 m cells). Spatial links then become links between a pair of spatial cells.

For example, in FIG. 10, node 1 node received on timestamp 1 five CAM packets from node 2, each with an RSSI of −90 dBm, out of a total 10 CAM packets sent by node 2. Hence, the PDR is 50%, and the mean RSSI is −90 dBm. If on timestamp 2 the nodes remained in the same locations but were completely unable to communicate, the PDR would drop to 25% (5 out of 20), assuming node 2 sent 10 messages on timestamp 2 (10+10=20).

Note that geographical locations or spatial cells connected by spatial links in the spatial connectivity graph may be non adjacent, for example spatial links may connect non-adjacent cells, hopping over one or more cells, in the grid (e.g. when distant cells are connected due to favourable line of sight conditions). Also, multiple different paths (where a path is composed by the concatenation of one or more links) can exist between a pair of spatial cells. To see an example of this consider a large building that blocks the connectivity between two spatial cells C1 and C2. Assume packets can go around the building either on the left or on the right side. Then there will be two spatial paths between C1 and C2. These features allow the graph to accurately reflect spatial connectivity and adjust to topographic conditions in a manner that previous protocols could not.

Spatial links can be seen as uni or bidirectional by aggregating or separating data for the two directions L1→L2 and L2→L1. Furthermore, periodically or progressively, older aggregated data can be deprecated. Because spatial connectivity changes slowly (changes will come mostly from changes in topography: new buildings, roads, etc), this is will be a slow process as well. Although the server stores multiple metrics pertaining to each spatial link, not all need be used simultaneously. The next section describes how this spatial connectivity information can be used by the routing protocol using only PDR data.

Figure 11:
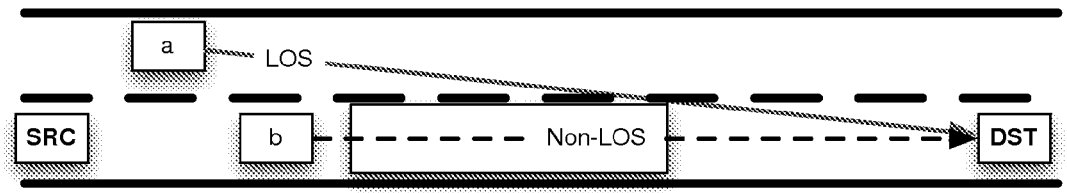
FIG. 11: Represents how line of sight conditions may break the assumption that the closer a node is to the destination, the better a relay it is. In this case a large truck blocks the signal and prevents node b from communicating with the destination DST. Node a, although further from DST than node b, can communicate with DST due to a clear line of sight.

The previous embodiments ranks potential forwarders based on their distance to the destination. However, because of non-uniform radio propagation conditions, this is not always a perfect metric. For example, in FIG. 11, node b is closest to the destination DST but cannot communicate with it due to an obstruction created by a large vehicle (e.g. truck). Despite being further away, node a, on the other hand, is able to communicate with the destination because it has an unobstructed line of sight to it.

The routing protocol's goal is to, at each step, choose the candidate that has the best chance of leading to a successful and quick delivery of the packet to the destination. Because it is impossible for every node to have continuously-up-to-date global topology information, protocols have to rely on heuristics. Above, it was described why spatial connectivity is a good heuristic for routing in an urban environment.

Spatial connectivity can be incorporated into the forwarding process as follows. The fundamental of the previous embodiments' method stays the same, but the distance-based ranking of the candidates by the ranking algorithm is replaced by a new cost function called Expected Path Cost (EPC). EPC for each node is computed as follows:

1) The statistical spatial connectivity graph ($G_{stat}$) is used as a starting point.
2) The edges in $G_{stat}$ that belong to the local neighborhood where the node has real-time information are removed and replaced by edges reflecting that real-time information yielding $G_{stat+rt}$. This ensures the freshest information available is used. However, if no real-time information is available, the protocol can continue using statistical data alone.
3) The minimum EPC path between the node and the intended destination is computed for the graph $G_{stat+rt}$. EPC is defined as the sum of the Expected Transmission Counts (ETXs) for all the edges that compose the path, thus being the expected transmission counts for the whole path. ETX represents the expected number of transmissions to successfully transfer a packet over a link, based on the packet delivery rate observed on that link. It is defined as $1/(PDR_{fv} * PDR_{rv})$, where $PDR_{fv}$ is the PDR in the forward direction of the link and $PDR_{rv}$ the PDR in the reverse direction. EPC, by summing ETX over all the path links, is therefore an estimation of how many transmissions will be necessary to deliver the packet from the current node to its intended destination (end-to-end cost), for each specific path. The minimum EPC is an estimation of how many transmissions will be necessary to deliver the packet from the current node to its intended destination (end-to-end cost), for the path with the lowest EPC. Once the link costs are established, the minimum cost paths can be computed using for example the well-known Floyd-Warshall algorithm.

The node with the lowest minimum EPC is therefore given the best rank and highest forwarding priority. Node utility is thus inversely connected with EPC. Lower-ranked nodes are used as backups just like the previous embodiments. This strategy combines both real time information for the local neighborhood and statistical data for other locations. This allows the protocol to route around obstacles and choose forward corridors that at the same time maximize the probability of delivery and minimize latency.

Figure 12:
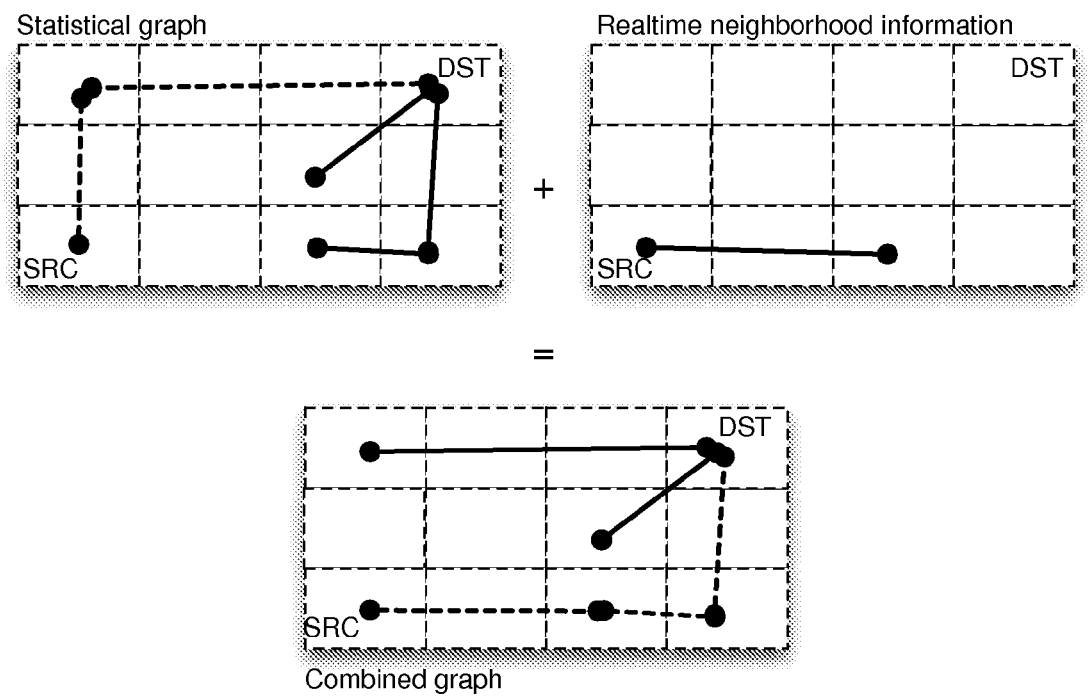
FIG. 12: Gives an example of how the proposed spatial connectivity extension is able to combine statistical and real-time connectivity information to find routing paths.

An example of how the protocol works in practice is depicted in FIG. 12. In this case the goal is to find the minimum cost path between the cells marked SRC and DST. Assume for simplicity that all spatial links/edges have unit cost and the node currently evaluating the paths is at the SRC cell. The statistical map shows the shortest (and unique) path as a two-hop path going over the top of the map. However, real-time neighborhood information shows that there is no neighbor in the top-left cell as predicted by the statistical data. The protocol then removes the non-existent link, and replaces it by the one from the real-time information. This enables it to find a 3-hop path along the bottom of the map, which would otherwise go undetected.

In order to run the protocol, vehicle nodes should be equipped with a suitably sized computer (e.g. Miktronik RB411UAHR) supporting 802.11p communications.

The spatial connectivity information server can use standard server hardware and software (e.g. Intel-based processor running GNU/Linux). On the software side a database engine (e.g. MySQL) and a web-server are required (e.g. Apache).

The described method is based on communications between moving vehicles, but can also include communications with parked vehicles or fixed access points with vehicular communication capabilities (e.g., road-side units—RSUs).

The routing strategy for a network including parked vehicles or fixed access points is the same as the routing strategy for a network of only moving vehicles, by simply incorporating several nodes characterized by a fixed position and null velocity. These can be used transparently by the methods of the present disclosure without adaptation or modification.

Moreover, the presence of these static nodes, as part of a network comprising moving nodes, will improve coverage and, especially if they are parked or placed in strategic geographical positions, may improve the routing strategy in urban environments with intersections and obstacles such as buildings.

The above described embodiments are combinable. The following dependent claims set out particular embodiments of the invention.

REFERENCES

[1] F. Bai, H. Krishnan, V. Sadekar, G. Holl, and T. Elbatt, "Towards characterizing and classifying communication-based automotive applications from a wireless networking perspective," in Proceedings of IEEE Workshop on Automotive Networking and Applications (AutoNet), 2006.

[2] R. Meireles, M. Boban, P. Steenkiste, O. Tonguz, and J. Barros, "Experimental study on the impact of vehicular obstructions in vanets," in Vehicular Networking Conference (VNC), 2010 IEEE, 2010.

[3] F. Bai, D. D. Stancil, and H. Krishnan, "Toward understanding characteristics of dedicated short range communications (dsrc) from a perspective of vehicular network engineers," in Proceedings of the 16th annual international conference on Mobile computing and networking, ser. MobiCom '10. ACM, 2010.

[4] B.-C. Seet, G. Liu, B.-S. Lee, C.-H. Foh, K.-J. Wong, and K.-K. Lee, "A-star: A mobile ad hoc routing strategy for metropolis vehicular communications," in NETWORKING 2004., ser. Lecture Notes in Computer Science. Springer Berlin/Heidelberg, 2004, vol. 3042.

[5] M. Jerbi, S.-M. Senouci, R. Meraihi, and Y. Ghamri-Doudane, "An improved vehicular ad hoc routing protocol for city environments," Communications, ICC 07'. IEEE International Conference on, 2007.

[6] S. Biswas and R. Morris, "ExOR: opportunistic multihop routing for wireless networks," Computer Communication Review, vol. 35, no. 4, 2005.

[7] M.-H. Lu, P. Steenkiste, and T. Chen, "Design, implementation and evaluation of an efficient opportunistic retransmission protocol," in Proceedings of the 15th annual international conference on Mobile computing and networking, ser. MobiCom '09. ACM, 2009.

[8] A. Miu, H. Balakrishnan, and C. E. Koksal, "Improving loss resilience with multi-radio diversity in wireless networks," in Proceedings of the 11th annual international conference on Mobile computing and networking, ser. MobiCom '05. ACM, 2005.

[9] D. B. Johnson and D. A. Maltz, "Dynamic source routing in ad hoc wireless networks," in Mobile Computing. Kluwer Academic Publishers, 1996.

[10] B. Karp and H. T. Kung, "Gpsr: Greedy perimeter stateless routing for wireless networks," in Mobile Computing and Networking, 2000.

[11] F. Bai and B. Krishnamachari, "Spatio-temporal variations of vehicle traffic in vanets: facts and implications," 2009.

[12] Q. Yang, A. Lim, S. Li, J. Fang, and P. Agrawal, "Acar: Adaptive connectivity aware routing for vehicular ad hoc networks in city scenarios," Mobile Networks and Applications, vol. 15, 2010.

[13] A. Festag, R. Baldessari, W. Zhang, L. Le, A. Sarma, and M. Fukukawa, "Car-2-x communication for safety and infotainment in europe," NEC Technical Journal, vol. 3, no. 1, 2008.

[14] CAR-2-CAR Communication Consortium, "Manifesto—Overview of the C2C-CC system," 2007.

[15] J. Li, J. Jannotti, D. De Couto, D. Karger, and R. Morris, "A scalable location service for geographic ad hoc routing," in Proceedings of the $6^{th}$ annual international conference on Mobile computing and networking, ser. MobiCom '00. ACM, 2000.

[16] J. S. Otto, F. E. Bustamante, and R. A. Berry, "Down the block and around the corner—the impact of radio propagation on inter-vehicle wireless communication," in Proc. of IEEE International Conference on Distributed Computing Systems (ICDCS), 2009.

[17] S. Kaul, K. Ramachandran, P. Shankar, S. Oh, M. Gruteser, I. Seskar, and T. Nadeem, "Effect of antenna placement and diversity on vehicular network communications," in Sensor, Mesh and Ad Hoc Communications and Networks, 2007. SECON '07. 4th Annual IEEE Communications Society Conference on, 2007.

[18] D. Couto, D. Aguayo, J. Bicket, and R. Morris, "A high-throughput path metric for multi-hop wireless routing," Wireless Networks, vol. 11, no. 4, 2005.

[19] M. Heissenbuttel, T. Braun, T. Bernoulli, and M. Walchli, "Blr: Beaconless routing algorithm for mobile ad-hoc networks," Elseviers Computer Communications Journal (Special Issue), vol. 27, 2003.

[20] H. Fuβler, J. Widmer, M. Kasemann, M. Mauve, and H. Hartenstein, "Contention-based forwarding for mobile ad hoc networks," Ad Hoc Networks, vol. 1, no. 4, 2003.

[21] R. S. Schwartz, K. Das, H. Scholten, and P. Havinga, "Exploiting beacons for scalable broadcast data dissemination in vanets," in Proceedings of the 9th ACM international workshop on Vehicular inter-networking, systems, and applications, ser. VANET '12. ACM, 2012.

[22] S. Chachulski, M. Jennings, S. Katti, and D. Katabi, "Trading structure for randomness in wireless opportunistic routing," in Proceedings of the 2007 conference on Applications, technologies, architectures, and protocols for computer communications. ACM, 2007.

[23] S.-Y. Ni, Y.-C. Tseng, Y.-S. Chen, and J.-P. Sheu, "The broadcast storm problem in a mobile ad hoc network," in Proceedings of the $5^{th}$ annual ACM/IEEE international conference on Mobile computing and networking, ser. MobiCom '99. ACM, 1999.

[24] Y. Mylonas, M. Lestas, and A. Pitsillides, "Speed adaptive probabilistic flooding in cooperative emergency warning," in Proceedings of the $4^{th}$ Annual International Conference on Wireless Internet, ser. WICON '08. ICST, 2008.

[25] N. Wisitpongphan, O. Tonguz, J. Parikh, P. Mudalige, F. Bai, and V. Sadekar, "Broadcast storm mitigation techniques in vehicular ad hoc networks," Wireless Communications, IEEE, vol. 14, no. 6, 2007.

[26] L. Briesemeister, "Group membership and communication in highly mobile ad hoc networks," Ph.D. dissertation, Technischen Universitat Berlin, 2001.

[27] W. Li, J.-B. Wei, and S. Wang, "An evolutionary-dynamic tdma slot assignment protocol for ad hoc networks," in Wireless Communications and Networking Conference, 2007.WCNC 2007. IEEE, 2007.

[28] S. Kamruzzaman and M. Alam, "Dynamic tdma slot reservation protocol for cognitive radio ad hoc networks," in Computer and Information Technology (ICCIT), 2010 13th International Conference on, 2010.

The invention claimed is:

1. A method for distributed multi-hop packet forwarding based on geographic coordinates for vehicular communications between nodes, each node having its own geographical coordinates and the geographical coordinates of a destination node of one said vehicular communication being known, said method comprising each node obtaining its one-hop neighbor nodes' coordinates from periodically broadcast beacons from said neighbor nodes and said method comprising the steps for each node, at each hop, upon receiving a packet:

based on the current node's position and packet header information of the packet, verifying if the current node is closer to the destination than a previous hop; if not, dropping the packet;

ranking a utility of the current node as a forwarder against the utility of potential forwarder nodes which are said one-hop neighbor nodes that are closer to the destination than the previous hop;

if the current node is one of a predetermined number of best utility ranked forwarder nodes, then considering the current node as being in a forwarding zone; if not, dropping the packet;

if the current node is in the forwarding zone, waiting a period of time inversely proportional to the current node utility rank before forwarding the packet;

if, while waiting, the current node overhears another node forwarding the same packet, cancelling the forwarding of the packet;

wherein the packet header comprises three node addresses: original packet source, packet destination, and packet previous hop, wherein each address includes both the respective node identifier and geographic coordinates, and wherein said nodes are vehicle nodes or a mix of vehicle nodes and fixed nodes.

2. The method according to claim 1 further comprising each node acknowledging, to the previous hop node, the transmission of the packet by its own forwarding of the packet.

3. The method according to claim 1 further comprising each node retransmitting the packet if no acknowledgment of said packet has been received after a predetermined time limit.

4. The method according to claim 1 further comprising each node keeping a history of overheard packets and dropping packets if they are present in said history.

5. The method according to claim 1 comprising introducing transmission slotting at the network layer, by dividing the time after a packet reception into a number of forwarding slots, wherein the potential forwarder nodes distribute themselves for transmission over the slots without explicit coordination, each node being assigned one and only one slot, and each slot having zero or more nodes, wherein the slot duration is sufficiently long that nodes in different forwarding slots will not contend at the MAC level if their contention windows overlap, and the slot duration is sufficiently short that latency is mitigated, in particular the slot duration is longer but not substantially longer than the average MAC layer contention window.

6. The method according to claim 1 comprising, for ranking the utility of the current node as the potential forwarder, considering if the node is in the forwarding zone and waiting a period of time inversely proportional to the current node utility rank, the following steps for each potential forwarder node, at each hop and for each packet:

defining the node set of potential forwarders for the current packet, said set being composed of the nodes that are both closer to the destination node than the previous hop and within the current node radio range;

building an array from said set and sorting the array from the node closest to the destination node to the node farthest from the destination node;

considering the index at which a node appears in said array being its utility rank as a forwarder;

for each node in said set, assigning it a forwarding slot calculated by the value of the smallest integer not less than the division of said node utility rank divided by a predetermined number of nodes per slot;

wherein each node refrains from forwarding if the node is not one of the predetermined number of best utility ranked forwarder nodes.

7. The method according to claim 1 wherein the predetermined number of best utility ranked forwarder nodes is not more than 5, not more than 10, or not more than 15.

8. The method according to claim 1 wherein the destination node is addressable by its geographical coordinates through prior knowledge of its geographical coordinates or a through a location service.

9. The method according to claim 1 wherein ranking the utility of the node as the forwarder comprises ranking by the distance to the destination, in particular by the hop length distance.

10. The method according to claim 1 wherein ranking the utility of the current node as the forwarder comprises ranking the utility of the node as the forwarder based on spatial connectivity information which is collected, aggregated, and distributed, comprising the steps of:

each node, over a period or periods of time, recording information about its position and the CAMs, Cooperative Awareness Messages, it receives from other nodes;

each node uploading CAM data records to a spatial connectivity server, said CAM data records comprising the geographical coordinates of each of the nodes which emitted said collected CAMs, and optionally the RSSI of said CAMs;

the spatial connectivity server aggregating and processing said CAM data records into a spatial connectivity graph comprising nodes and edges, where the nodes are geographical locations and the edges are spatial links, wherein each spatial link is a connection between two geographic locations and comprises one or more of three quality metrics: i) expected packet delivery rate, ii) expected mean Received Signal Strength, RSSI, if available, and iii) probability of the presence of vehicles in the connected locations;

each node, downloading said spatial connectivity graph from the spatial connectivity server;

using said spatial connectivity graph for ranking the utility of the node as the forwarder, wherein the utility is the minimum expected packet transmission count of the graph paths between current node and the destination node, or the utility is the maximum expected mean Received Signal Strength, RSSI, of the graph paths between the current node and the destination node, or the utility is the maximum expected probability of the presence of vehicles in the graph paths between the current node and the destination node.

11. The method according to claim 1 comprising each node replacing:

the quality metric of an edge of said previously aggregated and processed spatial connectivity graph, where the edge is a spatial link which is a connection between two geographical locations, with real-time collected data of said quality metric of said edge, when such real-time collected data is available for said connection between the two geographical locations.

12. The method according to claim 11 where the geographical location is a spatial cell of predetermined fixed or variable size.

13. The method according to claim 12 wherein the spatial cell is a rectangular area, in particular a square area, in particular a 50 m by 50 m square area.

14. The method according to claim 11 wherein the utility of the current node as the forwarder is calculated based on the spatial connectivity graph, comprising:

mapping both the current node's and destination node's locations into source and destination spatial cells in the spatial connectivity graph;

computing the path from source cell to destination cell with the minimum total expected number of transmissions from source node to destination node for each potential forwarder, using the packet delivery rate associated with each spatial link in the graph as the quality metric;

sorting the array of potential forwarders according to the minimum total expected number of transmissions from source node to destination node of the previously computed path for each potential forwarder.

15. The method according to claim 14 comprising each node replacing the expected number of transmissions necessary to deliver the packet between each pair of adjacent geographical locations in said edges of said graph with real-time collected data for each pair of adjacent geographical locations, when such real-time collected data is available.

16. The method according to claim 10 wherein each of said CAM data records comprises, for each recurring period of time: a timestamp; the current node's own geographical location; the number of sent CAMs by the current node; the node IDs of the nodes that emitted the CAMs received by the current node; and the number and mean RSSI of said CAMs received by the current node.

17. A device for distributed multi-hop packet forwarding based on geographic coordinates for vehicular communications between nodes, each node comprising a geographical coordinate module, said device comprising a computer data processor of a current node and a computer readable non-transitory data carrier comprising the computer program instructions for causing the data processer to perform a procedure comprising:

obtaining the current node's one-hop neighbor nodes' coordinates from periodically broadcast beacons from said neighbor nodes;

upon receiving a packet,
based on the current node's position and packet header information of the packet, verifying if the current node is closer to a destination node of the packet than a previous hop; if not, dropping the packet;
ranking a utility of the current node as a forwarder against the utility of potential forwarder nodes which are said one-hop neighbor nodes that are closer to the destination than the previous hop;
if the current node is one of a predetermined number of best utility ranked forwarder nodes, then considering the current node as being in a forwarding zone; if not, dropping the packet;
if the current node is in the forwarding zone, waiting a period of time inversely proportional to the current node utility rank before forwarding the packet;
if, while waiting, the current node overhears another node forwarding the same packet, cancelling the forwarding of the packet;

wherein the packet header comprises three node addresses: original packet source, packet destination, and packet previous hop, wherein each address includes both the respective node identifier and geographic coordinates, and wherein said nodes are vehicle nodes or a mix of vehicle nodes and fixed nodes.

18. The device of claim 17 wherein the procedure upon receiving a packet further comprises acknowledging, to the previous hop node, transmission of the packet by the current node's forwarding of the packet.

19. The device of claim 17 wherein the procedure upon receiving a packet further comprises retransmitting the packet if no acknowledgment of said packet has been received after a predetermined time limit.

20. The device of claim 17 wherein the procedure upon receiving a packet further comprises keeping a history of overheard packets and dropping packets if they are present in said history.

21. The device of claim 17 wherein the procedure further comprises introducing transmission slotting at the network layer, by dividing the time after a packet reception into a number of forwarding slots, wherein the potential forwarder nodes distribute themselves for transmission over the slots without explicit coordination, each node being assigned one and only one slot, and each slot having zero or more nodes, wherein the slot duration is sufficiently long that nodes in different forwarding slots will not contend at the MAC level if their contention windows overlap, and the slot duration is sufficiently short that latency is mitigated, in particular the slot duration is longer but not substantially longer than the average MAC layer contention window.

22. The device of claim 17 wherein the procedure upon receiving a packet further comprises, for ranking the utility of the current node as the potential forwarder, considering if the current node is in the forwarding zone and waiting a period of time inversely proportional to the current node utility rank, the following steps for each potential forwarder node:

defining the node set of potential forwarders for the packet, said set being composed of the nodes that are both closer to the destination node than the previous hop and within the current node radio range;

building an array from said set and sorting the array from the node closest to the destination node to the node farthest from the destination node;

considering the index at which a node appears in said array being its utility rank as a forwarder;

for each node in said set, assigning it a forwarding slot calculated by the value of the smallest integer not less than the division of said node utility rank divided by a predetermined number of nodes per slot;

wherein the current node refrains from forwarding if the node in said set is not one of the predetermined number of best utility ranked forwarder nodes.

23. The device of claim 17 wherein the predetermined number of best utility ranked forwarder nodes is not more than 5, not more than 10, or not more than 15.

24. The device of claim 17 wherein the destination node is addressable by its geographical coordinates through prior knowledge of its geographical coordinates or a through a location service.

25. The device of claim 17 wherein ranking the utility of the node as the forwarder comprises ranking by the distance to the destination, in particular by the hop length distance.

26. The device of claim 17 wherein ranking the utility of the current node as the forwarder comprises ranking the utility of the node as the forwarder based on spatial connectivity information which is collected, aggregated, and distributed, comprising the steps of:

each node, over a period or periods of time, recording information about its position and the CAMs, Cooperative Awareness Messages, it receives from other nodes;

each node uploading CAM data records to a spatial connectivity server, said CAM data records comprising the geographical coordinates of each of the nodes which emitted said collected CAMs, and optionally the RSSI of said CAMs;

the spatial connectivity server aggregating and processing said CAM data records into a spatial connectivity graph comprising nodes and edges, where the nodes are geographical locations and the edges are spatial links, wherein each spatial link is a connection between two geographic locations and comprises one or more of three quality metrics: i) expected packet delivery rate, ii) expected mean Received Signal Strength, RSSI, if available, and iii) probability of the presence of vehicles in the connected locations;

each node, downloading said spatial connectivity graph from the spatial connectivity server;

using said spatial connectivity graph for ranking the utility of the node as the forwarder, wherein the utility is the minimum expected packet transmission count of the graph paths between current node and the destination node, or the utility is the maximum expected mean Received Signal Strength, RSSI, of the graph paths between the current node and the destination node, or the utility is the maximum expected probability of the presence of vehicles in the graph paths between the current node and the destination node.

27. The device of claim 17 wherein the procedure upon receiving the packet further comprises replacing:

the quality metric of an edge of said previously aggregated and processed spatial connectivity graph, where the edge is a spatial link which is a connection between two geographical locations, with real-time collected data of said quality metric of said edge, when such real-time collected data is available for said connection between the two geographical locations.

28. The device of claim 27 where the geographical location is a spatial cell of predetermined fixed or variable size.

29. The device of claim 28 wherein the spatial cell is a rectangular area, in particular a square area, in particular a 50 m by 50 m square area.

30. The device of claim 27 wherein the utility of the current node as the forwarder is calculated based on the spatial connectivity graph, comprising:

mapping both the current node's and destination node's locations into source and destination spatial cells in the spatial connectivity graph;

computing the path from source cell to destination cell with the minimum total expected number of transmissions from source node to destination node for each potential forwarder, using the packet delivery rate associated with each spatial link in the graph as the quality metric;

sorting the array of potential forwarders according to the minimum total expected number of transmissions from source node to destination node of the previously computed path for each potential forwarder.

31. The device of claim 30 wherein the procedure further comprises replacing the expected number of transmissions necessary to deliver the packet between each pair of adjacent geographical locations in said edges of said graph with real-time collected data for each pair of adjacent geographical locations, when such real-time collected data is available.

32. The device of claim 26 wherein each of said CAM data records comprises, for each recurring period of time: a timestamp; the current node's own geographical location; the number of sent CAMs by the current node; the node IDs of the nodes that emitted the CAMs received by the current node; and the number and mean RSSI of said CAMs received by the current node.

33. A non-transitory computer readable medium storing computer program instructions for execution by a data processer of a current node of a vehicular communication network participate in distributed multi-hop packet forwarding based on geographic coordinates for communications between nodes, the computer program instructions when executed cause the data processor to perform a procedure comprising:

obtaining the current node's one-hop neighbor nodes' coordinates from periodically broadcast beacons from said neighbor nodes;

upon receiving a packet, based on the current node's position and packet header information of the packet, verifying if the current node is closer to a destination node of the packet than a previous hop; if not, dropping the packet;

ranking a utility of the current node as a forwarder against the utility of potential forwarder nodes which are said one-hop neighbor nodes that are closer to the destination than the previous hop;

if the current node is one of a predetermined number of best utility ranked forwarder nodes, then considering the current node as being in a forwarding zone; if not, dropping the packet;

if the current node is in the forwarding zone, waiting a period of time inversely proportional to the current node utility rank before forwarding the packet;

if, while waiting, the current node overhears another node forwarding the same packet, cancelling the forwarding of the packet;

wherein the packet header comprises three node addresses: original packet source, packet destination, and packet previous hop, wherein each address includes both the respective node identifier and geographic coordinates, and wherein said nodes are vehicle nodes or a mix of vehicle nodes and fixed nodes.

* * * * *